United States Patent
DeForest et al.

(10) Patent No.: US 9,743,078 B2
(45) Date of Patent: Aug. 22, 2017

(54) STANDARDS-COMPLIANT MODEL-BASED VIDEO ENCODING AND DECODING

(71) Applicant: Euclid Discoveries, LLC, Concord, MA (US)

(72) Inventors: Darin DeForest, Phoenix, AZ (US); Charles P. Pace, North Chittenden, VT (US); Nigel Lee, Chestnut Hill, MA (US); Renato Pizzorni, Lima (PE)

(73) Assignee: Euclid Discoveries, LLC, Concord, MA (US)

( * ) Notice: Subject to any disclaimer, the term of this patent is extended or adjusted under 35 U.S.C. 154(b) by 148 days.

(21) Appl. No.: 13/797,644

(22) Filed: Mar. 12, 2013

(65) Prior Publication Data

US 2013/0230099 A1 Sep. 5, 2013

Related U.S. Application Data

(63) Continuation-in-part of application No. 13/725,940, filed on Dec. 21, 2012, now Pat. No. 9,578,345,
(Continued)

(51) Int. Cl.
*H04N 7/26* (2006.01)
*H04N 19/50* (2014.01)
*H04N 19/543* (2014.01)

(52) U.S. Cl.
CPC ..... *H04N 19/00569* (2013.01); *H04N 19/543* (2014.11)

(58) Field of Classification Search
CPC .................. H04N 19/00569; H04N 19/543
(Continued)

(56) References Cited

U.S. PATENT DOCUMENTS 5,117,287 A 5/1992 Koike et al.
5,586,200 A 12/1996 Devaney et al.
(Continued)

FOREIGN PATENT DOCUMENTS

EP 0 614 318 B1 9/1994
EP 1 124 379 A2 8/2001
(Continued)

OTHER PUBLICATIONS

Keysers, et al., "Deformation Models for Image Recognition," IEEE Transactions on Pattern Analysis and Machine Intelligence, 29(8):1422-1435 (2007).
(Continued)

*Primary Examiner* — Tung Vo
*Assistant Examiner* — Zaihan Jiang
(74) *Attorney, Agent, or Firm* — Hamilton, Brook, Smith & Reynolds, P.C.

(57) ABSTRACT

A model-based compression codec applies higher-level modeling to produce better predictions than can be found through conventional block-based motion estimation and compensation. Computer-vision-based feature and object detection algorithms identify regions of interest throughout the video datacube. The detected features and objects are modeled with a compact set of parameters, and similar feature/object instances are associated across frames. Associated features/objects are formed into tracks and related to specific blocks of video data to be encoded. The tracking information is used to produce model-based predictions for those blocks of data, enabling more efficient navigation of the prediction search space than is typically achievable through conventional motion estimation methods. A hybrid framework enables modeling of data at multiple fidelities and selects the appropriate level of modeling for each portion of video data. A compliant-stream version of the
(Continued)

model-based compression codec uses the modeling information indirectly to improve compression while producing bitstreams that can be interpreted by standard decoders.

23 Claims, 16 Drawing Sheets

Related U.S. Application Data which is a continuation-in-part of application No. 13/121,904, filed as application No. PCT/US2009/059653 on Oct. 6, 2009, now Pat. No. 8,942,283, said application No. 13/121,904 is a continuation-in-part of application No. 12/522,322, filed as application No. PCT/US2008/000090 on Jan. 4, 2008, now Pat. No. 8,908,766, said application No. 12/522,322 is a continuation-in-part of application No. 11/396,010, filed on Mar. 31, 2006, now Pat. No. 7,457,472, which is a continuation-in-part of application No. 11/336,366, filed on Jan. 20, 2006, now Pat. No. 7,436,981, which is a continuation-in-part of application No. 11/280,625, filed on Nov. 16, 2005, now Pat. No. 7,457,435, which is a continuation-in-part of application No. 11/230,686, filed on Sep. 20, 2005, now Pat. No. 7,426,285, which is a continuation-in-part of application No. 11/191,562, filed on Jul. 28, 2005, now Pat. No. 7,158,680, application No. 13/797,644, which is a continuation-in-part of application No. 13/772,230, filed on Feb. 20, 2013, now Pat. No. 8,902,971.

(60) Provisional application No. 61/615,795, filed on Mar. 26, 2012, provisional application No. 61/707,650, filed on Sep. 28, 2012, provisional application No. 61/103,362, filed on Oct. 7, 2008, provisional application No. 60/881,966, filed on Jan. 23, 2007, provisional application No. 60/628,819, filed on Nov. 17, 2004, provisional application No. 60/628,861, filed on Nov. 17, 2004, provisional application No. 60/598,085, filed on Jul. 30, 2004, provisional application No. 60/667,532, filed on Mar. 31, 2005, provisional application No. 60/670,951, filed on Apr. 13, 2005, provisional application No. 61/616,334, filed on Mar. 27, 2012, provisional application No. 61/650,363, filed on May 22, 2012.

(58) Field of Classification Search
USPC .................................................. 375/240.08
See application file for complete search history.

(56) References Cited

U.S. PATENT DOCUMENTS

| | | | |
|---|---|---|---|
| 5,608,458 A | 3/1997 | Chen et al. | |
| 5,710,590 A | 1/1998 | Ichige et al. | |
| 5,748,247 A | 5/1998 | Hu | |
| 5,760,846 A | 6/1998 | Lee | |
| 5,774,591 A | 6/1998 | Black et al. | |
| 5,774,595 A | 6/1998 | Kim | |
| 5,826,165 A | 10/1998 | Echeita et al. | |
| 5,917,609 A | 6/1999 | Breeuwer et al. | |
| 5,933,535 A | 8/1999 | Lee et al. | |
| 5,969,755 A | 10/1999 | Courtney | |
| 5,991,447 A | 11/1999 | Eifrig et al. | |
| 6,044,168 A | 3/2000 | Tucenyan et al. | |
| 6,061,400 A | 5/2000 | Pearlstein et al. | |
| 6,069,631 A * | 5/2000 | Tao et al. | 345/418 |
| 6,088,484 A | 7/2000 | Mead | |
| 6,249,318 B1 | 6/2001 | Girod et al. | |
| 6,256,423 B1 | 7/2001 | Krishnamurthy et al. | |
| 6,307,964 B1 | 10/2001 | Lin et al. | |
| 6,381,275 B1 | 4/2002 | Fukuhara et al. | |
| 6,418,166 B1 * | 7/2002 | Wu et al. | 375/240.12 |
| 6,546,117 B1 | 4/2003 | Sun et al. | |
| 6,574,353 B1 | 6/2003 | Schoepflin | |
| 6,608,935 B2 | 8/2003 | Nagumo et al. | |
| 6,611,628 B1 | 8/2003 | Sekiguchi et al. | |
| 6,614,466 B2 | 9/2003 | Thomas | |
| 6,625,310 B2 | 9/2003 | Lipton et al. | |
| 6,625,316 B1 | 9/2003 | Maeda | |
| 6,640,145 B2 | 10/2003 | Hoffberg et al. | |
| 6,646,578 B1 * | 11/2003 | Au | 341/67 |
| 6,661,004 B2 | 12/2003 | Aumond et al. | |
| 6,664,956 B1 | 12/2003 | Erdem | |
| 6,711,278 B1 | 3/2004 | Gu et al. | |
| 6,731,799 B1 | 5/2004 | Sun et al. | |
| 6,731,813 B1 | 5/2004 | Stewart | |
| 6,738,424 B1 | 5/2004 | Allmen et al. | |
| 6,751,354 B2 | 6/2004 | Foote et al. | |
| 6,774,917 B1 | 8/2004 | Foote et al. | |
| 6,792,154 B1 | 9/2004 | Stewart | |
| 6,842,483 B1 | 1/2005 | Au et al. | |
| 6,870,843 B1 | 3/2005 | Stewart | |
| 6,909,745 B1 | 6/2005 | Puri et al. | |
| 6,912,310 B1 | 6/2005 | Park et al. | |
| 6,925,122 B2 | 8/2005 | Gorodnichy | |
| 6,950,123 B2 | 9/2005 | Martins | |
| 7,003,117 B2 | 2/2006 | Kacker et al. | |
| 7,027,599 B1 | 4/2006 | Entwistle | |
| 7,043,058 B2 | 5/2006 | Cornog et al. | |
| 7,088,845 B2 | 8/2006 | Gu et al. | |
| 7,095,786 B1 * | 8/2006 | Schonfeld | G06T 7/2006 375/240.16 |
| 7,158,680 B2 | 1/2007 | Pace | |
| 7,162,055 B2 | 1/2007 | Gu et al. | |
| 7,162,081 B2 | 1/2007 | Timor et al. | |
| 7,164,718 B2 | 1/2007 | Maziere et al. | |
| 7,173,925 B1 | 2/2007 | Dantu et al. | |
| 7,184,073 B2 | 2/2007 | Varadarajan et al. | |
| 7,227,893 B1 * | 6/2007 | Srinivasa | G06K 9/00771 348/155 |
| 7,352,386 B1 | 4/2008 | Shum et al. | |
| 7,356,082 B1 | 4/2008 | Kuhn | |
| 7,415,527 B2 | 8/2008 | Varadarajan et al. | |
| 7,424,157 B2 | 9/2008 | Pace | |
| 7,424,164 B2 | 9/2008 | Gondek et al. | |
| 7,426,285 B2 | 9/2008 | Pace | |
| 7,436,981 B2 | 10/2008 | Pace | |
| 7,457,435 B2 | 11/2008 | Pace | |
| 7,457,472 B2 | 11/2008 | Pace et al. | |
| 7,508,990 B2 | 3/2009 | Pace | |
| 7,574,406 B2 | 8/2009 | Varadarajan et al. | |
| 7,606,305 B1 | 10/2009 | Rault | |
| 7,630,522 B2 | 12/2009 | Popp et al. | |
| 7,715,597 B2 | 5/2010 | Costache et al. | |
| 7,738,550 B2 * | 6/2010 | Kuhn | 375/240.01 |
| 7,788,191 B2 | 8/2010 | Jebara | |
| 7,869,518 B2 | 1/2011 | Kim et al. | |
| 8,019,170 B2 | 9/2011 | Wang | |
| 8,036,464 B2 | 10/2011 | Sridhar et al. | |
| 8,065,302 B2 | 11/2011 | Sridhar et al. | |
| 8,068,677 B2 | 11/2011 | Varadarajan et al. | |
| 8,086,692 B2 | 12/2011 | Sridhar et al. | |
| 8,090,670 B2 | 1/2012 | Sridhar et al. | |
| 8,135,062 B1 | 3/2012 | Cote | |
| 8,140,550 B2 | 3/2012 | Varadarajan et al. | |
| 8,149,915 B1 | 4/2012 | Novotny et al. | |
| 8,243,118 B2 | 8/2012 | Pace | |
| 8,259,794 B2 | 9/2012 | Bronstein et al. | |
| 8,290,038 B1 | 10/2012 | Wang et al. | |
| 8,290,049 B2 | 10/2012 | Kondo et al. | |
| 8,379,712 B2 | 2/2013 | Park et al. | |
| 8,737,464 B1 | 5/2014 | Zhang et al. | |
| 8,902,971 B2 | 12/2014 | Pace | |
| 8,908,766 B2 | 12/2014 | Pace | |
| 8,942,283 B2 | 1/2015 | Pace | |
| 8,964,835 B2 | 2/2015 | Pace | |

(56) References Cited

U.S. PATENT DOCUMENTS

| | | |
|---|---|---|
| 9,106,977 B2 | 8/2015 | Pace |
| 9,532,069 B2 | 12/2016 | Pace et al. |
| 9,578,345 B2 | 2/2017 | DeForest et al. |
| 9,621,917 B2 | 4/2017 | Kottke et al. |
| 2001/0038714 A1 | 11/2001 | Masumoto et al. |
| 2002/0016873 A1 | 2/2002 | Gray et al. |
| 2002/0025001 A1* | 2/2002 | Ismaeil .................. H04N 19/56 375/240.16 |
| 2002/0054047 A1 | 5/2002 | Toyama et al. |
| 2002/0059643 A1 | 5/2002 | Kitamura et al. |
| 2002/0073109 A1 | 6/2002 | Toriumi |
| 2002/0085633 A1 | 7/2002 | Kim et al. |
| 2002/0114392 A1 | 8/2002 | Sekiguchi et al. |
| 2002/0116529 A1 | 8/2002 | Hayden |
| 2002/0164068 A1 | 11/2002 | Yan |
| 2002/0196328 A1 | 12/2002 | Piotrowski |
| 2003/0011589 A1 | 1/2003 | Desbrun et al. |
| 2003/0058943 A1 | 3/2003 | Zakhor et al. |
| 2003/0063778 A1 | 4/2003 | Rowe et al. |
| 2003/0103647 A1 | 6/2003 | Rui et al. |
| 2003/0112243 A1 | 6/2003 | Garg et al. |
| 2003/0122966 A1 | 7/2003 | Markman et al. |
| 2003/0163690 A1 | 8/2003 | Stewart |
| 2003/0169812 A1 | 9/2003 | Maziere et al. |
| 2003/0194134 A1 | 10/2003 | Wenzel et al. |
| 2003/0195977 A1 | 10/2003 | Liu et al. |
| 2003/0206589 A1 | 11/2003 | Jeon |
| 2003/0231769 A1 | 12/2003 | Bolle et al. |
| 2003/0235341 A1 | 12/2003 | Gokturk et al. |
| 2004/0013286 A1 | 1/2004 | Viola et al. |
| 2004/0017852 A1 | 1/2004 | Garrido et al. |
| 2004/0022320 A1 | 2/2004 | Kawada et al. |
| 2004/0028139 A1 | 2/2004 | Zaccarin et al. |
| 2004/0037357 A1 | 2/2004 | Bagni et al. |
| 2004/0081359 A1 | 4/2004 | Bascle et al. |
| 2004/0085315 A1 | 5/2004 | Duan et al. |
| 2004/0091048 A1 | 5/2004 | Youn |
| 2004/0107079 A1 | 6/2004 | MacAuslan |
| 2004/0113933 A1 | 6/2004 | Guier |
| 2004/0135788 A1 | 7/2004 | Davidson et al. |
| 2004/0246336 A1 | 12/2004 | Kelly, III et al. |
| 2004/0264574 A1 | 12/2004 | Lainema |
| 2005/0015259 A1 | 1/2005 | Thumpudi et al. |
| 2005/0128306 A1 | 6/2005 | Porter et al. |
| 2005/0185823 A1 | 8/2005 | Brown et al. |
| 2005/0193311 A1 | 9/2005 | Das et al. |
| 2005/0281335 A1 | 12/2005 | Ha |
| 2006/0013450 A1 | 1/2006 | Shan et al. |
| 2006/0029253 A1 | 2/2006 | Pace |
| 2006/0045185 A1 | 3/2006 | Kiryati et al. |
| 2006/0067585 A1 | 3/2006 | Pace |
| 2006/0120571 A1 | 6/2006 | Tu et al. |
| 2006/0120613 A1 | 6/2006 | Su et al. |
| 2006/0133681 A1 | 6/2006 | Pace |
| 2006/0177140 A1 | 8/2006 | Pace |
| 2006/0204115 A1* | 9/2006 | Burazerovic ................. 382/239 |
| 2006/0233448 A1 | 10/2006 | Pace et al. |
| 2006/0274949 A1 | 12/2006 | Gallagher et al. |
| 2007/0025373 A1 | 2/2007 | Stewart |
| 2007/0053513 A1 | 3/2007 | Hoffberg |
| 2007/0071100 A1 | 3/2007 | Shi et al. |
| 2007/0071336 A1 | 3/2007 | Pace |
| 2007/0153025 A1 | 7/2007 | Mitchell et al. |
| 2007/0183661 A1 | 8/2007 | El-Maleh et al. |
| 2007/0185946 A1 | 8/2007 | Basri et al. |
| 2007/0239778 A1 | 10/2007 | Gallagher |
| 2007/0268964 A1 | 11/2007 | Zhao |
| 2007/0297645 A1 | 12/2007 | Pace |
| 2008/0027917 A1 | 1/2008 | Mukherjee et al. |
| 2008/0040375 A1 | 2/2008 | Vo et al. |
| 2008/0043848 A1* | 2/2008 | Kuhn .................. G06F 17/30811 375/240.16 |
| 2008/0101652 A1 | 5/2008 | Zhao et al. |
| 2008/0117977 A1 | 5/2008 | Lee et al. |
| 2008/0152008 A1 | 6/2008 | Sun et al. |
| 2008/0232477 A1 | 9/2008 | Wang et al. |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0168884 A1 | 7/2009 | Lu et al. |
| 2009/0175538 A1* | 7/2009 | Bronstein .......... G06F 17/30799 382/173 |
| 2009/0262804 A1 | 10/2009 | Pandit et al. |
| 2009/0292644 A1 | 11/2009 | Varadarajan et al. |
| 2010/0008424 A1 | 1/2010 | Pace et al. |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0135575 A1* | 6/2010 | Guo et al. ..................... 382/164 |
| 2010/0135590 A1 | 6/2010 | Yang et al. |
| 2010/0167709 A1 | 7/2010 | Varadarajan |
| 2010/0271484 A1 | 10/2010 | Fishwick et al. |
| 2010/0272185 A1 | 10/2010 | Gao et al. |
| 2010/0278275 A1 | 11/2010 | Yang et al. |
| 2010/0290524 A1 | 11/2010 | Lu et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1* | 7/2011 | Pace ..................... G06T 7/2006 375/240.1 |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0155536 A1 | 6/2012 | Pace |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest |
| 2013/0114703 A1 | 5/2013 | DeForest et al. |
| 2013/0170541 A1 | 7/2013 | Pace et al. |
| 2014/0286433 A1 | 9/2014 | He et al. |
| 2014/0355687 A1 | 12/2014 | Takehara et al. |
| 2015/0124874 A1 | 5/2015 | Pace |
| 2015/0189318 A1 | 7/2015 | Pace |
| 2015/0256850 A1 | 9/2015 | Kottke |
| 2016/0073111 A1 | 3/2016 | Lee et al. |
| 2017/0070745 A1 | 3/2017 | Lee et al. |

FOREIGN PATENT DOCUMENTS

| | | |
|---|---|---|
| EP | 1 250 012 | 10/2002 |
| EP | 1 426 898 B1 | 6/2004 |
| EP | 1 779 294 A2 | 5/2007 |
| JP | 2003-253190 | 11/1991 |
| JP | 5-244585 A | 9/1993 |
| JP | 2007-038873 A | 2/1995 |
| JP | 2007-095587 | 4/1995 |
| JP | 2007-288789 | 10/1995 |
| JP | 2008-235383 | 9/1996 |
| JP | 2008-263623 | 10/1996 |
| JP | 2000-20955 A | 7/2000 |
| JP | 2001-100731 A | 4/2001 |
| JP | 2001-103493 A | 4/2001 |
| JP | 2002-525735 | 8/2002 |
| JP | 2004-94917 A | 3/2004 |
| JP | 2004 356747 | 12/2004 |
| JP | 2006-521048 A | 9/2006 |

(56) References Cited

FOREIGN PATENT DOCUMENTS

| | | |
|---|---|---|
| JP | 2007-504696 A | 3/2007 |
| JP | 200820782 | 5/2008 |
| JP | 2009-501479 | 1/2009 |
| JP | 2010-517426 A | 5/2010 |
| TW | H03253190 | 11/1991 |
| TW | 200521885 | 7/2005 |
| TW | 200527327 | 8/2005 |
| WO | WO 98/27515 | 6/1998 |
| WO | WO 98/59497 A1 | 12/1998 |
| WO | WO 99/26415 | 5/1999 |
| WO | WO 00/16563 | 3/2000 |
| WO | WO 00/45600 | 8/2000 |
| WO | WO 02/102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |
| WO | WO 2013/148002 A2 | 10/2013 |
| WO | WO 2013/148091 A1 | 10/2013 |
| WO | WO 2014/051712 A1 | 4/2014 |
| WO | WO 2015/138008 A1 | 9/2015 |
| WO | WO 2016/040116 A1 | 3/2016 |

OTHER PUBLICATIONS

Viola, P. and Jones, M.J., "Robust Real-Time Face Detection," International Journal of Computer Vision, 20(17):138-153 (2004).

Notification and Transmittal of International Search Report and Written Opinion dated Jun. 10, 2013 for PCT/US2013/029297, entitled "Video Compression Repository and Model Reuse".

Zhang, et al., "A Novel Video Coding Framework by Perceptual Representation and Macroblock-Based Matching Pursuit Algorithm", Department of Computer Science and Technology, pp. 322-331 (2007).

Osama, et al., "Video Compression Using Matching Pursuits", *IEEE Transactions on Circuits and Systems for Video Technology*, vol. 9, No. 1, Feb. 1999.

Neff, et al., "Matching-Pursuit Based Video Compression", Department of Electrical Engineering and Computer Science, MPEG Meeting, Mar. 11, 1995.

Ebrahimi, T., et al. "MPEG-4 natural video coding—An Overview", Signal Processing: Image Communication 15:365-385 (2000).

Bay, H., et al., "SURF: Speeded Up Robust Features", ETH Zurich {bay, vangool}@vision.ee.ethz.ch, 1-14.

Lowe, D.G., "Distinctive Image Features from Scale-Invariant Keypoints", *International Journal of Computer Vision*, 1-28 (2004).

Pati, Y.C., et al., "Orthogonal Matching Pursuit: Recursive Function Approximation with Applications to Wavelet Decomposition", $27^{th}$ *Annual Asilomar conference on Signals systems and Computers*, 1-5 (1993).

Viola, P., et al., "Rapid Object Detection using a Boosted Cascade of Simple Features", *Accepted Conference on Computer Vision and Pattern Recognition*, 1-9 (2001).

Wiegand, T., et al., "Overview of the H.264/AVC Video Coding Standard", *IEEE Transactions on Circuits and Systems for Video Technology*, 13(7):560-576 (2003).

"Series H: Audiovisual and Multimedia Systems: Infrastructure of audiovisual services—Coding of moving video; Advanced video coding for generic audiovisual services", *ITU-T*, H.264: 1-657 (2012).

Garrett-Glaser, J., "Diary of an x264 Developer", http://x264dev.multimedia.cx/, 1-7 (2008).

Brenneman, A., et al., "x264", *Wikipedia—The Free Encyclopedia*: http://en.wikipedia,org/wiki/X264, 1-5.

"H.264/MPEG-4 AVC", *Wikipedia—The Free Encyclopedia*: http://en.wikipedia,org/wiki/X264, 1-17.

OpenCV Documentation Page, http://docs.opencv.org/.

Intel Integrated Performance Primitives—Documentation, http://software.intel.com/en-us/articles/intel-integrated-performance-primitives-documentation/.

Jones, M. and P. Viola, "Fast Multi View Face Detection," Mitsubishi Electrical Laboratories, Jul. 2003 (10 pp.).

Gunsel, B. et al., "Content based access to video objects: Temporal segmentation, visual summarization, and feature extraction," Signal Processing, vol. 66, pp. 261 280 (1998).

Piamsa nga, P. and N. Babaguchi, "Motion estimation and detection of complex object by analyzing resampled movements of parts," in Proc. ICIP '04, 1 (365 368), Oct. 2004.

Vidal, R. et al., "Generalized principal component analysis (GPCA)", in Proc. CVPR '03, 1 (I621-628), Jun. 2003.

Vidal, R. and R. Hartley, "Motion segmentation with missing data using PowerFactorization and GPCA," in Proc. CVPR 04, 2 (II-310-316), Jun.-Jul. 2004.

Huang, R. et al., "Sparse representation of images with hybrid linear models," in Proc. ICIP '04, 2(1281 1284) Oct. 2004.

Rong, S. et al., "Efficient spatiotemporal segmentation and video object generation for highway surveillance video," in Proc. IEEE Int'l, Conf. Communications, Circuits and Systems and West Sino Expositions, 1(580 584), Jun. Jul. 2002.

Toklu, C. et al., "Simultaneous Alpha Map Generation and 2 D Mesh Tracking for Multimedia Applications," Proceedings of the International Conference on Image Processing: 1997, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Rehg, J. M. and Witkin, A. P., "Visual Tracking with Deformation Models," Proc. IEEE Int'l. Conf. on Robotics and Automation, pp. 844-850 (Apr. 1991).

Kass, Michael, Andrew Witzin, and Demetri Terzopoulos, "Snakes: Active contour Models," International Journal of Computer Vision (1988).

Tao, H.et al., "Compression of MPEG-4 Facial Animation Parameters for Transmission of Talking Heads," IEEE Transactions on Circuits and Systems for Video Technology, vol. 9, No. 2, pp. 264-276 (Mar. 1999).

Reinders, M.J.T.et al., "Facial Feature Localization and Adaptation of a Generic Face Model for model-Based Coding," Signal Processing: Image Communication, No. 7, pp. 57-74 (1995).

Doenges, P. K., "MPEG-4: Audio/Video and Synthetic Graphics/Audio for Mixed Media," *Signal Processing: Image Communication*, No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Antoszczyszyn, P.M., et al., "Tracking of the Motion of Important Facial Features in Model-Based Coding," Signal Processing, 66(2):249-260, (Apr. 30, 1998).

Fukuhara, T., et al., "3-D Motion Estimation of Human Head for Model-Based Image Coding," IEEE Proceedings—I, 140(1):26-35, (Feb. 1, 1993).

International Search Report for International Application No. PCT/US2009/059653, 8 pp., dated Feb. 2, 2010.

Written Opinion of the International Searching Authority for International Application No. PCT/US2009/059653, 8 pp., dated Feb. 2, 2010.

Notification of Transmittal of the International Search Report and the Written Opinion of the International Searching Authority, or the Declaration, for International Application No. PCT/US2008/000090, 19 pp., dated Aug. 18, 2010.

(56) References Cited

OTHER PUBLICATIONS

Invitation to Pay Additional Fees and, Where Applicable, Protest Fee, for International Application No. PCT/US2008/000090, dated Jun. 2, 2010.
Notification Concerning Transmittal of International Preliminary Report on Patentability (Chapter I of the Patent Cooperation Treaty), for International Application No. PCT/US2008/00090, dated Sep. 2, 2010.
Amit, Yali, 2D Object Detection and Recognition: Models, Algorithms, and Networks, The MIT Press, Cambridge, Massachusetts, pp. 147-149 (Sections 7.3: Detecting Pose and 7.4: Bibliographical Notes and Discussion) (2002).
Huang, T.S. et al., "Chapter 5: Three-Dimensional Model-Based Image Communication," Visual Information Representation, Communication, and Image Processing, Editors: Chen, Chang Wen, et al., Marcel Dekker, Inc., New York, New York, pp. 97-117 (1999).
Extended European Search Report for 06 73 3758.4, dated Mar. 8, 2011 (17 pages).
Extended European Search Report for 06 74 0318.8, dated May 6, 2011 (14 pages).
Fischler, M.A., et al., "Random Sample Consensus: A Paradigm for Model Fitting with Applications to Image Analysis and Automated Cartography," Communications of the Association for Computing Machinery, 24(6):381-395 (1981).
Harris, C., et al., "A Combined Corner and Edge Detector," Alvey Vision Conference, Proceedings of the Alvey Vision Conference, p. 147 (1988).
Irani, M., et al., "Detecting and Tracking Multiple Moving Objects Using Temporal Integration," European Conference on Computer Vision, 282-287 (1992).
Notification Concerning Transmittal of the International Preliminary Report on Patentability for PCT/US2009/059653, dated Apr. 21, 2011 (10 pages).
Park, et al., "Qualitative Estimation of Camera Motion Parameters From the Linear Composition of Optical Flow," Pattern Recognition: The Journal of the Pattern Recognition Society, 37:767-779 (2004).
Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).
Schröder, K., et al., "Combined Description of Shape and Motion in an Object Based Coding Scheme Using Curved Triangles," Proceedings of the International Conference on Image Processing, 2:390-393 (1995).
Tabatabai, A. J., et al., "Motion Estimation Methods for Video Compressio—A Review," Journal of the Franklin Institute, 335(8): 1411-1441 (1998).
Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).
Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).
Shin, J. et al., "Optical flow-based real-time object tracking using non-prior training active feature model," Academic Press Limited, GB, vol. 11, No. 3, pp. 204-218 (Jun. 1, 2005).
Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).
Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).
Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).
Notification Concerning Transmittal of International Preliminary Report on Patentability, in International Application No. PCT/US2008/000092, pp. 9, dated Aug. 6, 2009.
Dodgson, N. A., "Image resampling," Technical Report, UCAM-CL-TR-261, ISSN 1476-2986, University of Cambridge, Computer Laboratory, (264 pp.) (Aug. 1992).
Richardson, I., "Vcodex White Paper: Video Compression Patents," Vcodex Ltd., pp. 3-6 (2008-2011).
Notification Concerning Transmittal of International Preliminary Report on Patentability, in International Application No. PCT/US2008/000091, pp. 9, dated Aug. 6, 2009.
Jolliffe, I.T., "Principal Component Analysis, Second Edition," Springer, 518 pp., Apr. 2002.
"Bit-Torrent: Introduction", Retrieved on: Jan. 18, 2006, retrieved online at: http://web.archive.org/web/20060118042451/http://www.bittorrent.com/introduction.html.
Office Action from U.S. Appl. No. 13/341,437, dated Nov. 20, 2012.
Office Action from U.S. Appl. No. 12/522,357, dated Dec. 12, 2012.
Office Action from U.S. Appl. No. 12/522,322, dated Dec. 11, 2012.
Braspenning, R., De Haan, G., "True Motion Estimation Using Features Correspondence," Electronic Imaging, (2004).
Chen, M.J., et al., "Efficient multi-frame motion estimation algorithms for MPEG-4 AVC/JVT/H.264," 2004 IEEE International Symposium on Circuits and Sytems, 111-737 (2004).
Lee, T.K., et al., "A New Motion Vector Composition Algorithm for H.264 Multiple Reference Frame Motion Estimation," Retrieved from the internet URL:http://eprints.lib.hokudai.ac.jp/dspace/bitstream/2115/39749/1/TA-P2-7.pdf [retrieved on Jan. 16, 2015].
Smith, L., et al., "A tutorial on Principal Components Analysis," Feb. 26, 2002.
Su., Yeping, et al., "Fast multiple reference frame motion estimation for H.264/AVC," IEEE Transactions on Circuits and Systems for Video Technology, 16(3): 447-452 (2006).
Wikipedia, Motion Perception; 6 pages; downloaded on Aug. 24, 2015; See https://en.wikipedia.org/wiki/Motion_perception#The_aperture_problem.
Bulla, C. et al., "High Quality Video Conferencing: Region of Interest Encoding and Joint Video/Audio Analysis," International Journal on Advances in Telecommunications, 6(3-4): 153-163 (Dec. 2013).
Chen, Z. et al., "Perception-oriented video coding based on foveated JND model A," Picture Coding Symposium 2009, Section 2 (May 2009).
International Search Report and Written Opinion dated Oct. 16, 2013 for International Application No. PCT/US2013/043884, entitled "Standards-Compliant Model-Based Video Encoding and Decoding."
International Preliminary Report on Patentability dated Mar. 31, 2015 for International Application No. PCT/US2013/043884, entitled: Standards-Compliant Model-Based Video Encoding and Decoding.
International Search Report and Written Opinion dated Oct. 11, 2013 for International Application No. PCT/US2013/025123, entitled "Context Based Video Encoding and Decoding."
International Preliminary Report on Patentability dated Oct. 9, 2014 for International Application No. PCT/US2013/025123, entitled: Context Based Video Encoding and Decoding.
Li, Z., et al., "Visual attention guided bit allocation in video compression," *Image and Vision Computing*, 29(1): 1-14 (Jan. 2011).
Naccari, M. et al., "Improving HEVC Compression Efficiency by Intensity Dependant Spatial Quantisation," MPEG Meeting (Jul. 2012).
Richardson, Iain E., *The H.264 Advanced Video Compression Standard*, 2nd Edition, Chapter 7: H.264 Transform and Coding, Apr. 20, 2010.
Tang, C-W., "Spatiotemporal Visual Considerations for Video Coding," IEEE Transactions on Multimedia, 9(2): 231-238 (Feb. 2007).
Wikipedia, "Lumi masking," Retrieved from the Internet: https://web.archive.org/web/20061124153834/http://en.wikipedia.org/wiki/Lumi_masking, Retrieved on: Nov. 8, 2006, 1 page.

(56) References Cited

OTHER PUBLICATIONS

Notice of Allowance for U.S. Appl. No. 13/725,940 dated Oct. 6, 2016, entitled: Model-Based Video Encoding and Decoding.
Final Office Action for U.S. Appl. No. 13/725,940 dated Apr. 19, 2016, "Model-Based Video Encoding and Decoding".

* cited by examiner

STANDARDS-COMPLIANT MODEL-BASED VIDEO ENCODING AND DECODING

RELATED APPLICATION(S)

This application is a continuation-in-part of U.S. application Ser. No. 13/725,940 filed on Dec. 21, 2012, which claims the benefit of U.S. Provisional Application No. 61/615,795 filed on Mar. 26, 2012 and U.S. Provisional Application No. 61/707,650 filed on Sep. 28, 2012. This application also is a continuation-in part of U.S. patent application Ser. No. 13/121,904, filed Oct. 6, 2009, which is a U.S. National Stage of PCT/US2009/059653 filed Oct. 6, 2009, which claims the benefit of U.S. Provisional Application No. 61/103,362, filed Oct. 7, 2008. The '904 application is also a continuation-in part of U.S. patent application Ser. No. 12/522,322, filed Jan. 4, 2008, which is a U.S. National Stage of PCT/US2008/000090 filed Jan. 4, 2008, which claims the benefit of U.S. Provisional Application No. 60/881,966, filed Jan. 23, 2007, is related to U.S. Provisional Application No. 60/811,890, filed Jun. 8, 2006, and is a continuation-in-part of U.S. application Ser. No. 11/396,010, filed Mar. 31, 2006, now U.S. Pat. No. 7,457,472, which is a continuation-in-part of U.S. application Ser No. 11/336,366 filed Jan. 20, 2006, now U.S. Pat. No. 7,436,981, which is a continuation-in-part of U.S. application Ser. No. 11/280,625 filed Nov. 16, 2005, now U.S. Pat. No. 7,457,435, which claims the benefit of U.S. Provisional Application No. 60/628,819 filed Nov. 17, 2004 and U.S. Provisional Application No. 60/628,861 filed Nov. 17, 2004. U.S. application Ser. No. 11/280,625 is also a continuation-in-part of U.S. application Ser. No. 11/230,686 filed Sep. 20, 2005, now U.S. Pat. No. 7,426,285, which is a continuation-in-part of U.S. application Ser. No. 11/191,562 filed Jul. 28, 2005, now U.S. Pat. No. 7,158,680 which claims the benefit of U.S. Provisional Application No. 60/598,085 filed Jul. 30, 2004. U.S. application Ser. No. 11/396,010 also claims priority to U.S. Provisional Application No. 60/667,532, filed Mar. 31, 2005 and U.S. Provisional Application No. 60/670,951, filed Apr. 13, 2005.

This present application is also related to U.S. Provisional Application No. 61/616,334, filed Mar. 27, 2012, U.S. Provisional Application No. 61/650,363 filed May 22, 2012 and U.S. application Ser. No. 13/772,230 filed Feb. 20, 2013 which claims the benefit of the '334 and '363 Provisional Applications.

The entire teachings of the above applications are incorporated herein by reference.

BACKGROUND

Video compression can be considered the process of representing digital video data in a form that uses fewer bits when stored or transmitted. Video compression algorithms can achieve compression by exploiting redundancies and irrelevancies in the video data, whether spatial, temporal, or color-space. Video compression algorithms typically segment the video data into portions, such as groups of frames and groups of pels, to identify areas of redundancy within the video that can be represented with fewer bits than the original video data. When these redundancies in the data are reduced, greater compression can be achieved. An encoder can be used to transform the video data into an encoded format, while a decoder can be used to transform encoded video back into a form comparable to the original video data. The implementation of the encoder/decoder is referred to as a codec.

Standard encoders divide a given video frame into non-overlapping coding units or macroblocks (rectangular regions of contiguous pels) for encoding. The macroblocks are typically processed in a traversal order of left to right and top to bottom in the frame. Compression can be achieved when macroblocks are predicted and encoded using previously-coded data. The process of encoding macroblocks using spatially neighboring samples of previously-coded macroblocks within the same frame is referred to as intra-prediction. Intra-prediction attempts to exploit spatial redundancies in the data. The encoding of macroblocks using similar regions from previously-coded frames, together with a motion estimation model, is referred to as inter-prediction. Inter-prediction attempts to exploit temporal redundancies in the data.

The encoder may measure the difference between the data to be encoded and the prediction to generate a residual. The residual can provide the difference between a predicted macroblock and the original macroblock. The encoder can generate motion vector information that specifies, for example, the location of a macroblock in a reference frame relative to a macroblock that is being encoded or decoded. The predictions, motion vectors (for inter-prediction), residuals, and related data can be combined with other processes such as a spatial transform, a quantizer, an entropy encoder, and a loop filter to create an efficient encoding of the video data. The residual that has been quantized and transformed can be processed and added back to the prediction, assembled into a decoded frame, and stored in a framestore. Details of such encoding techniques for video will be familiar to a person skilled in the art.

H.264/MPEG-4 Part 10 AVC (advanced video coding), hereafter referred to as H.264, is a codec standard for video compression that utilizes block-based motion estimation and compensation and achieves high quality video representation at relatively low bitrates. This standard is one of the encoding options used for Blu-ray disc creation and within major video distribution channels, including video streaming on the internet, video conferencing, cable television and direct-broadcast satellite television. The basic coding units for H.264 are 16×16 macroblocks. H.264 is the most recent widely-accepted standard in video compression.

The basic MPEG standard defines three types of frames (or pictures), based on how the macroblocks in the frame are encoded. An I-frame (intra-coded picture) is encoded using only data present in the frame itself. Generally, when the encoder receives video signal data, the encoder creates I frames first and segments the video frame data into macroblocks that are each encoded using intra-prediction. Thus, an I-frame consists of only intra-predicted macroblocks (or "intra macroblocks"). I-frames can be costly to encode, as the encoding is done without the benefit of information from previously-decoded frames. A P-frame (predicted picture) is encoded via forward prediction, using data from previously-decoded I-frames or P-frames, also known as reference frames. P-frames can contain either intra macroblocks or (forward-)predicted macroblocks. A B-frame (bi-predictive picture) is encoded via bidirectional prediction, using data from both previous and subsequent frames. B-frames can contain intra, (forward-)predicted, or bi-predicted macroblocks.

As noted above, conventional inter-prediction is based on block-based motion estimation and compensation (BBMEC). The BBMEC process searches for the best match between the target macroblock (the current macroblock being encoded) and similar-sized regions within previously-decoded reference frames. When a best match is found, the encoder may transmit a motion vector. The motion vector may include a pointer to the best match's frame position as well as information regarding the difference between the best match and the corresponding target macroblock. One could conceivably perform exhaustive searches in this manner throughout the video "datacube" (height×width×frame index) to find the best possible matches for each macroblock, but exhaustive search is usually computationally prohibitive. As a result, the BBMEC search process is limited, both temporally in terms of reference frames searched and spatially in terms of neighboring regions searched. This means that "best possible" matches are not always found, especially with rapidly changing data.

A particular set of reference frames is termed a Group of Pictures (GOP). The GOP contains only the decoded pels within each reference frame and does not include information as to how the macroblocks or frames themselves were originally encoded (I-frame, B-frame or P-frame). Older video compression standards, such as MPEG-2, used one reference frame (the previous frame) to predict P-frames and two reference frames (one past, one future) to predict B-frames. The H.264 standard, by contrast, allows the use of multiple reference frames for P-frame and B-frame prediction. While the reference frames are typically temporally adjacent to the current frame, there is also accommodation for the specification of reference frames from outside the set of the temporally adjacent frames.

Conventional compression allows for the blending of multiple matches from multiple frames to predict regions of the current frame. The blending is often linear, or a log-scaled linear combination of the matches. One example of when this bi-prediction method is effective is when there is a fade from one image to another over time. The process of fading is a linear blending of two images, and the process can sometimes be effectively modeled using bi-prediction. Some past standard encoders such as the MPEG-2 interpolative mode allow for the interpolation of linear parameters to synthesize the bi-prediction model over many frames.

The H.264 standard also introduces additional encoding flexibility by dividing frames into spatially distinct regions of one or more contiguous macroblocks called slices. Each slice in a frame is encoded (and can thus be decoded) independently from other slices. I-slices, P-slices, and B-slices are then defined in a manner analogous to the frame types described above, and a frame can consist of multiple slice types. Additionally, there is typically flexibility in how the encoder orders the processed slices, so a decoder can process slices in an arbitrary order as they arrive to the decoder.

Historically, model-based compression schemes have been proposed to avoid the limitations of BBMEC prediction. These model-based compression schemes (the most well-known of which is perhaps the MPEG-4 Part 2 standard) rely on the detection and tracking of objects or features in the video and a method for encoding those features/objects separately from the rest of the video frame. These model-based compression schemes, however, suffer from the challenge of segmenting video frames into object vs. non-object (feature vs. non-feature) regions. First, because objects can be of arbitrary size, their shapes need to be encoded in addition to their texture (color content). Second, the tracking of multiple moving objects can be difficult, and inaccurate tracking causes incorrect segmentation, usually resulting in poor compression performance. A third challenge is that not all video content is composed of objects or features, so there needs to be a fallback encoding scheme when objects/features are not present.

While the H.264 standard allows a codec to provide better quality video at lower file sizes than previous standards, such as MPEG-2 and MPEG-4 ASP (advanced simple profile), "conventional" compression codecs implementing the H.264 standard typically have struggled to keep up with the demand for greater video quality and resolution on memory-constrained devices, such as smartphones and other mobile devices, operating on limited-bandwidth networks. Video quality and resolution are often compromised to achieve adequate playback on these devices. Further, as video resolution increases, file sizes increase, making storage of videos on and off these devices a potential concern.

SUMMARY OF THE INVENTION

The present invention recognizes fundamental limitations in the inter-prediction process of conventional codecs and applies higher-level modeling to overcome those limitations and provide improved inter-prediction, while maintaining the same general processing flow and framework as conventional encoders.

In the present invention, higher-level modeling provides an efficient way of navigating more of the prediction search space (the video datacube) to produce better predictions than can be found through conventional block-based motion estimation and compensation. First, computer-vision-based feature and object detection algorithms identify regions of interest throughout the video datacube. The detection algorithm may be from the class of nonparametric feature detection algorithms. Next, the detected features and objects are modeled with a compact set of parameters, and similar feature/object instances are associated across frames. The invention then forms tracks out of the associated feature/objects, relates the tracks to specific blocks of video data to be encoded, and uses the tracking information to produce model-based predictions for those blocks of data.

In embodiments, the specific blocks of data to be encoded may be macroblocks. The formed tracks relate features to respective macroblocks.

Feature/object tracking provides additional context to the conventional encoding/decoding process. Additionally, the modeling of features/objects with a compact set of parameters enables information about the features/objects to be stored efficiently in memory, unlike reference frames, whose totality of pels are expensive to store. Thus, feature/object models can be used to search more of the video datacube, without requiring a prohibitive amount of additional computations or memory. The resulting model-based predictions are superior to conventional inter-predictions, because the model-based predictions are derived from more of the prediction search space.

In some embodiments, the compact set of parameters includes information about the features/objects and this set is stored in memory. For a feature, the respective parameters include a feature descriptor vector and a location of the feature. The respective parameters are generated when the respective feature is detected.

The model-based compression framework (MBCF) of the present invention avoids the segmentation problem encountered by previous model-based schemes. While the MBCF of the present invention also detects and tracks features/objects to identify important regions of the video frame to encode, it does not attempt to encode those features/objects explicitly. Rather, the features/objects are related to nearby macroblocks, and it is the macroblocks that are encoded, as in "conventional" codecs. This implicit use of modeling information mitigates the segmentation problem in two ways: it keeps the sizes of the coding units (macroblocks) fixed (thus avoiding the need to encode object/feature shapes), and it lessens the impact of inaccurate tracking (since the tracking aids but does not dictate the motion estimation step). Additionally, the MBCF of the present invention applies modeling to video data at multiple fidelities, including a fallback option to conventional compression when features/objects are not present; this hybrid encoding scheme ensures that modeling information will only be used where needed and not incorrectly applied where it is not.

In an alternative embodiment, the MBCF may be modified so that the resulting bitstream of the encoder is H.264-compliant, meaning that the bitstream can be interpreted (decoded) by any standard H.264 decoder. The modifications in this standards-compliant MBCF (SC-MBCF) mostly involve simplification of processing options to fit entirely with the signal processing architecture of H.264. The most important of the modifications is the encoding of model-based motion vectors directly into the H.264-compliant bitstream, which incorporates modeling information in a way that is standards-compliant.

In further embodiments, the MBCF may be modified so that the resulting bitstream is compliant with any standard codec—including MPEG-2 and HEVC (H.265)—that employs block-based motion estimation followed by transform, quantization, and entropy encoding of residual signals. The steps to make the resulting bitstream compliant will vary depending on the standard codec, but the most important step will always be the encoding of model-based motion vectors directly into the compliant bitstream.

Computer-based methods, codecs and other computer systems and apparatus for processing video data may embody the foregoing principles of the present invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

The teachings of all patents, published applications and references cited herein are incorporated by reference in their entirety. A description of example embodiments of the invention follows.

The invention can be applied to various standard encodings and coding units. In the following, unless otherwise noted, the terms "conventional" and "standard" (sometimes used together with "compression," "codecs," "encodings," or "encoders") will refer to H.264, and "macroblocks" will be referred to without loss of generality as the basic H.264 coding unit.

Feature-Based Modeling
Definition of Features

Example elements of the invention may include video compression and decompression processes that can optimally represent digital video data when stored or transmitted. The processes may include or interface with a video compression/encoding algorithm(s) to exploit redundancies and irrelevancies in the video data, whether spatial, temporal, or spectral. This exploitation may be done through the use and retention of feature-based models/parameters. Moving forward, the terms "feature" and "object" are used interchangeably. Objects can be defined, without loss of generality, as "large features." Both features and objects can be used to model the data.

Features are groups of pels in close proximity that exhibit data complexity. Data complexity can be detected via various criteria, as detailed below, but the ultimate characteristic of data complexity from a compression standpoint is "costly encoding," an indication that an encoding of the pels by conventional video compression exceeds a threshold that would be considered "efficient encoding." When conventional encoders allocate a disproportionate amount of bandwidth to certain regions (because conventional inter-frame search cannot find good matches for them within conventional reference frames), it becomes more likely that the region is "feature-rich" and that a feature model-based compression method will improve compression significantly in those regions.

Feature Detection

Figure 1A:
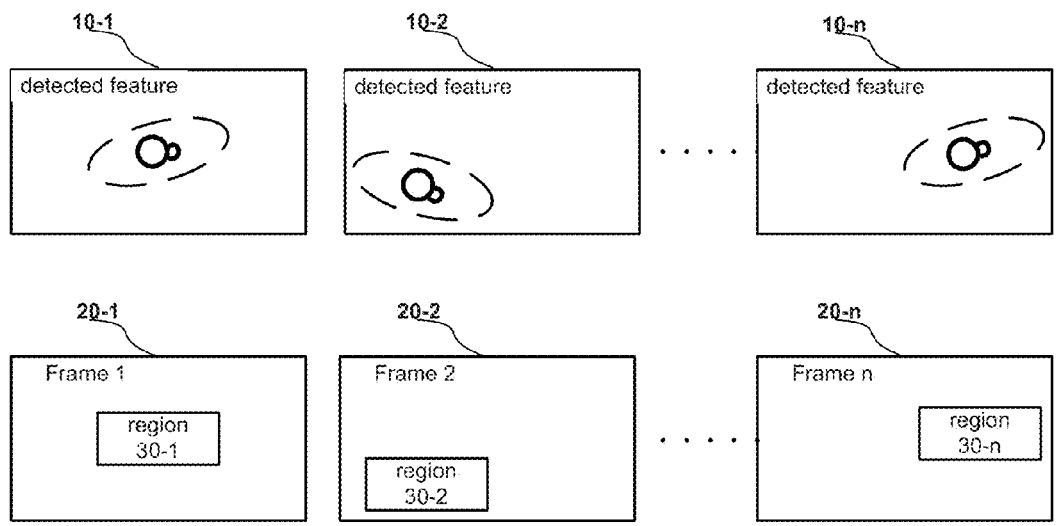
FIG. 1A is a block diagram depicting feature modeling according to an embodiment of the invention.

FIG. 1A depicts a feature whose instances 10-1, 10-2, . . . , 10-n have been detected in one or more frames of the video 20-1, 20-2, . . . , 20-n. Typically, such a feature can be detected using several criteria based on both structural information derived from the pels and complexity criteria indicating that conventional compression utilizes a disproportionate amount of bandwidth to encode the feature region. Each feature instance can be further identified spatially in its frame 20-1, 20-2, . . . , 20-n by a corresponding spatial extent or perimeter, shown in FIG. 1A as "regions" 30-1, 30-2, . . . , 30-n. These feature regions 30-1, 30-2, . . . , 30-n can be extracted, for instance, as simple rectangular regions of pel data. In one embodiment in the current invention, the feature regions are of size 16×16, the same size as H.264 macroblocks.

Many algorithms have been proposed in the literature for detecting features based on the structure of the pels themselves, including a class of nonparametric feature detection algorithms that are robust to different transformations of the pel data. For example, the scale invariant feature transform (SIFT) [Lowe, David, 2004, "Distinctive image features from scale-invariant keypoints," *Int. J. of Computer Vision*, 60(2):91-110] uses a convolution of a difference-of-Gaussian function with the image to detect blob-like features. The speeded-up robust features (SURF) algorithm [Bay, Herbert et al., 2008, "SURF: Speeded up robust features," *Computer Vision and Image Understanding*, 110(3):346-359] uses the determinant of the Hessian operator, also to detect blob-like features. In one embodiment of the present invention, the SURF algorithm is used to detect features.

Other feature detection algorithms are designed to find specific types of features, such as faces. In another embodiment of the present invention, the Haar-like features are detected as part of frontal and profile face detectors [Viola, Paul and Jones, Michael, 2001, "Rapid object detection using a boosted cascade of simple features," *Proc. of the 2001 IEEE Conf on Computer Vision and Pattern Recognition*, 1:511-518].

In another embodiment, discussed in full in U.S. application Ser. No. 13/121,904, filed Oct. 6, 2009, which is incorporated herein by reference in its entirety, features can be detected based on encoding complexity (bandwidth) encountered by a conventional encoder. Encoding complexity, for example, can be determined through analysis of the bandwidth (number of bits) required by conventional compression (e.g., H.264) to encode the regions in which features appear. Restated, different detection algorithms operate differently, but each are applied to the entire video sequence of frames over the entire video data in embodiments. For a non-limiting example, a first encoding pass with an H.264 encoder is made and creates a "bandwidth map." This in turn defines or otherwise determines where in each frame H.264 encoding costs are the highest.

Typically, conventional encoders such as H.264 partition video frames into uniform tiles (for example, 16×16 macroblocks and their subtiles) arranged in a non-overlapping pattern. In one embodiment, each tile can be analyzed as a potential feature, based on the relative bandwidth required by H.264 to encode the tile. For example, the bandwidth required to encode a tile via H.264 may be compared to a fixed threshold, and the tile can be declared a "feature" if the bandwidth exceeds the threshold. The threshold may be a preset value. The preset value may be stored in a database for easy access during feature detection. The threshold may be a value set as the average bandwidth amount allocated for previously encoded features. Likewise, the threshold may be a value set as the median bandwidth amount allocated for previously encoded features. Alternatively, one could calculate cumulative distribution functions of the tile bandwidths across an entire frame (or an entire video) and declare as "features" any tile whose bandwidth is in the top percentiles of all tile bandwidths.

In another embodiment, video frames can be partitioned into overlapping tiles. The overlapping sampling may be offset so that the centers of the overlapping tiles occur at the intersection of every four underlying tiles' corners. This over-complete partitioning is meant to increase the likelihood that an initial sampling position will yield a detected feature. Other, possibly more complex, topological partitioning methods are also possible.

Small spatial regions detected as features can be analyzed to determine if they can be combined based on some coherency criteria into larger spatial regions. Spatial regions can vary in size from small groups of pels to larger areas that may correspond to actual objects or parts of objects. However, it is important to note that the detected features need not correspond to unique and separable entities such as objects and sub-objects. A single feature may contain elements of two or more objects or no object elements at all. For the current invention, the critical characteristic of a feature is that the set of pels comprising the feature can be efficiently compressed, relative to conventional methods, by feature model-based compression techniques.

Coherency criteria for combining small regions into larger regions may include: similarity of motion, similarity of appearance after motion compensation, and similarity of encoding complexity. Coherent motion may be discovered through higher-order motion models. In one embodiment, the translational motion for each individual small region can be integrated into an affine motion model that is able to approximate the motion model for each of the small regions. If the motion for a set of small regions can be integrated into aggregate models on a consistent basis, this implies a dependency among the regions that may indicate a coherency among the small regions that could be exploited through an aggregate feature model.

Feature Model Formation

After features have been detected in multiple frames of a video, it is important that multiple instances of the same feature be related together. This process is known as feature association and is the basis for feature tracking (determining the location of a particular feature over time), described below. To be effective, however, the feature association process must first define a feature model that can be used to discriminate similar feature instances from dissimilar ones.

In one embodiment, the feature pels themselves can be used to model a feature. Feature pel regions, which are two-dimensional, can be vectorized and similar features can be identified by minimizing mean-squared error (MSE) or maximizing inner products between different feature pel vectors. The problem with this is that feature pel vectors are sensitive to small changes in the feature, such as translation, rotation, scaling, and changing illumination of the feature. Features often change in these ways throughout a video, so using the feature pel vectors themselves to model and associate features requires some accounting for these changes. In one embodiment, the invention accounts for such feature changes in the simplest way, by applying standard motion estimation and compensation algorithms found in conventional codecs (e.g., H.264), which account for translational motion of features. In other embodiments, more complex techniques can be used to account for rotations, scalings, and illumination changes of features from frame to frame.

In an alternate embodiment, feature models are compact representations of the features themselves ("compact" meaning "of lower dimension than the original feature pels vectors") that are invariant (remain unchanged when transformations of a certain type are applied) to small rotations, translations, scalings, and possibly illumination changes of the feature—meaning that if the feature changes slightly from frame to frame, the feature model will remain relatively constant. A compact feature model of this type is often termed a "descriptor." In one embodiment of the current invention, for example, the SURF feature descriptor has length 64 (compared to the length-256 feature pel vectors) and is based on sums of Haar wavelet transform responses. In another embodiment, a color histogram with 5 bins is constructed from a colormap of the feature pels, and this 5-component histogram acts as the feature descriptor. In an alternate embodiment, feature regions are transformed via 2-D DCT. The 2-D DCT coefficients are then summed over the upper triangular and lower triangular portions of the coefficient matrix. These sums then comprise an edge feature space and act as the feature descriptor.

When feature descriptors are used to model features, similar features can be identified by minimizing MSE or maximizing inner products between the feature descriptors (instead of between the feature pel vectors).

Feature Association and Tracking

Once features have been detected and modeled, the next step is to associate similar features over multiple frames. Each instance of a feature that appears in multiple frames is a sample of the appearance of that feature, and multiple feature instances that are associated across frames are considered to "belong" to the same feature. Once associated, multiple feature instances belonging to the same feature may be aggregated to form a feature track.

A feature track is defined as the (x,y) location of a feature as a function of frames in the video. One embodiment associates newly detected feature instances with previously tracked features (or, in the case of the first frame of the video, with previously detected features) as the basis for determining which features instances in the current frame are extensions of which previously-established feature tracks. The identification of a feature's instance in the current frame with a previously established feature track (or, in the case of the first video frame, with a previously detected feature) constitutes the tracking of the feature.

Figure 1B:
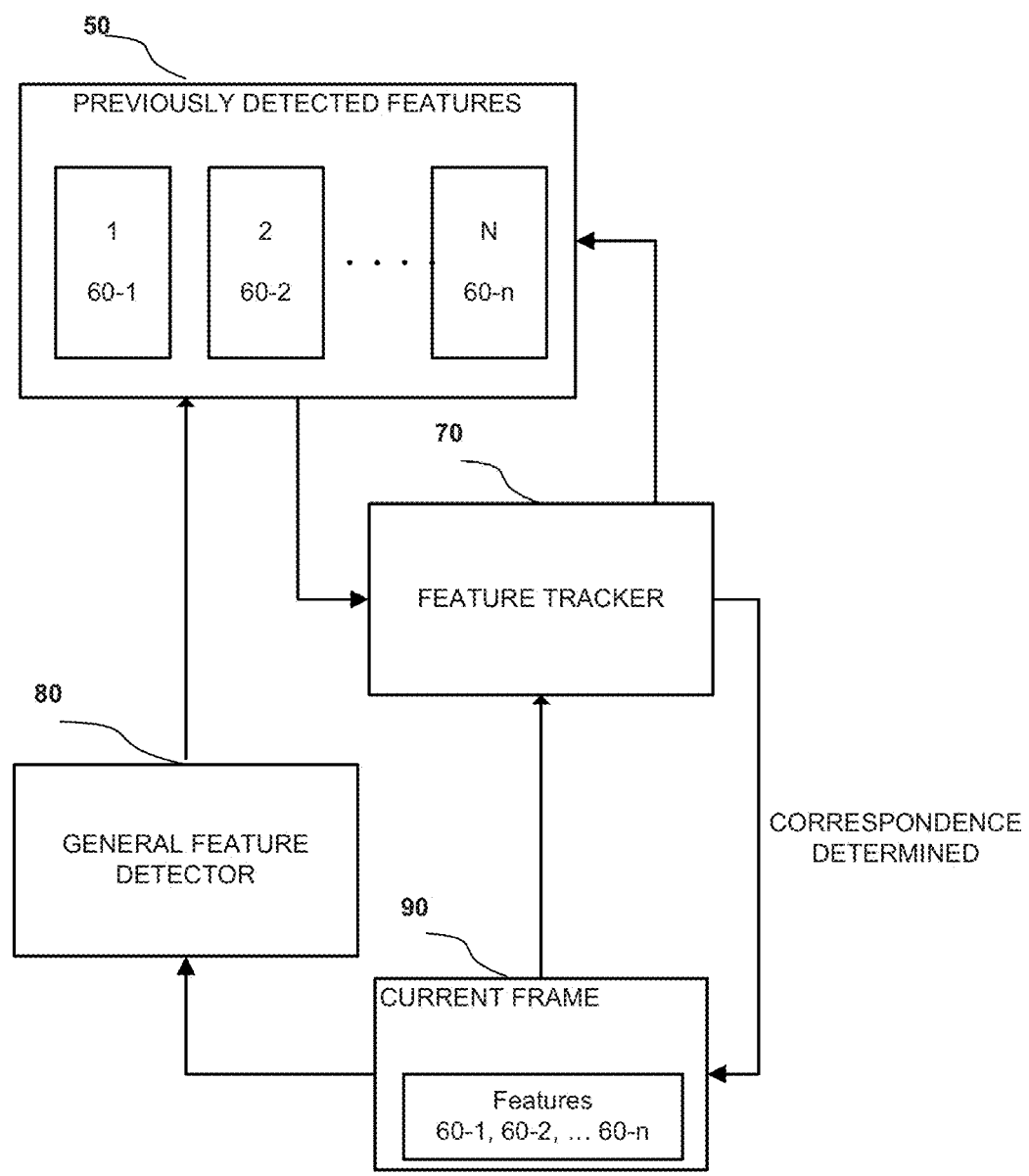
FIG. 1B is a block diagram depicting feature tracking according to an embodiment of the invention.

FIG. 1B demonstrates the use of a feature tracker 70 to track features 60-1, 60-2, . . . , 60-n. A feature detector 80 (for example, SIFT or SURF) is used to identify features in the current frame. Detected feature instances in the current frame 90 are matched to previously detected (or tracked) features 50. In one embodiment, prior to the association step, the set of candidate feature detections in the current frame can be sorted using an auto-correlation analysis (ACA) metric that measures feature strength based on an autocorrelation matrix of the feature, using derivative-of-Gaussian filters to compute the image gradients in the autocorrelation matrix, as found in the Harris-Stephens corner detection algorithm [Harris, Chris and Mike Stephens, 1988, "A combined corner and edge detector," in *Proc. of the 4th Alvey Vision Conference*, pp. 147-151]. Feature instances with high ACA values are given priority as candidates for track extension. In one embodiment, feature instances lower in the ACA-sorted list are pruned from the set of candidate features if they are within a certain distance (e.g., one pel) of a feature instance higher in the list.

In different embodiments, feature descriptors (e.g., the SURF descriptor) or the feature pel vectors themselves may serve as the feature models. In one embodiment, previously-tracked features, depicted as regions 60-1, 60-2, . . . , 60-n in FIG. 1B, are tested one at a time for track extensions from among the newly detected features in the current frame 90. In one embodiment, the most recent feature instance for each feature track serves as a focal point (or "target feature") in the search for a track extension in the current frame. All candidate feature detections in the current frame within a certain distance (e.g., 16 pels) of the location of the target feature are tested, and the candidate having minimum MSE with the target feature is chosen as the extension of that feature track. In another embodiment, a candidate feature is disqualified from being a track extension if its MSE with the target feature is larger than some threshold.

In a further embodiment, if no candidate feature detection in the current frame qualifies for extension of a given feature track, a limited search for a matching region in the current frame is conducted using either the motion compensated prediction (MCP) algorithm within H.264 or a generic motion estimation and compensation (MEC) algorithm. Both MCP and MEC conduct a gradient descent search for a matching region in the current frame that minimizes MSE (and satisfies the MSE threshold) with respect to the target feature in the previous frame. If no matches can be found for the target feature in the current frame, either from the candidate feature detection or from the MCP/MEC search process, the corresponding feature track is declared "dead" or "terminated."

In a further embodiment, if two or more feature tracks have feature instances in the current frame that coincide by more than some threshold (for example, 70% overlap), all but one of the feature tracks are pruned, or dropped from further consideration. The pruning process keeps the feature track that has the longest history and has the largest total ACA, summed over all feature instances.

The following combination of the above steps is henceforth referred to as the feature point analysis (FPA) tracker and serves as an embodiment of the invention: SURF feature detection, feature modeling (using SURF descriptors), ACA-based sorting of candidate features, and feature association and tracking via minimization of MSE from among candidate features, supplemented by MCP/MEC searching for track extensions.

In another embodiment of the invention, macroblocks in the video frame are thought of as features, registration of the features/macroblocks is done through the MCP engine found in H.264, and feature/macroblocks are associated using the inter-frame prediction metrics (such as sum of absolute transform differences [SATD]) of H.264; this combination is termed the macroblock cache (MBC) tracker. The MBC tracker is differentiated from standard inter-frame prediction because certain parameters are different (for example, search boundaries are disabled, so that the MBC tracker conducts a wider search for matches) and because certain aspects of the matching process are different. In a third embodiment, SURF detections are related to nearby macroblocks, and the macroblocks are associated and tracked using the MCP and inter-frame prediction engines of H.264; this combination is termed the SURF tracker.

Feature-Based Compression

Feature modeling (or data modeling in general) can be used to improve compression over standard codecs. Standard inter-frame prediction uses block-based motion estimation and compensation to find predictions for each coding unit (macroblock) from a limited search space in previously decoded reference frames. Exhaustive search for good predictions throughout all past reference frames is computationally prohibitive. By detecting and tracking features throughout the video, feature modeling provides a way of navigating the prediction search space to produce improved predictions without prohibitive computations. In the following, the terms "feature-based" and "model-based" are used interchangeably, as features are a specific type of model.

Figure 1C:
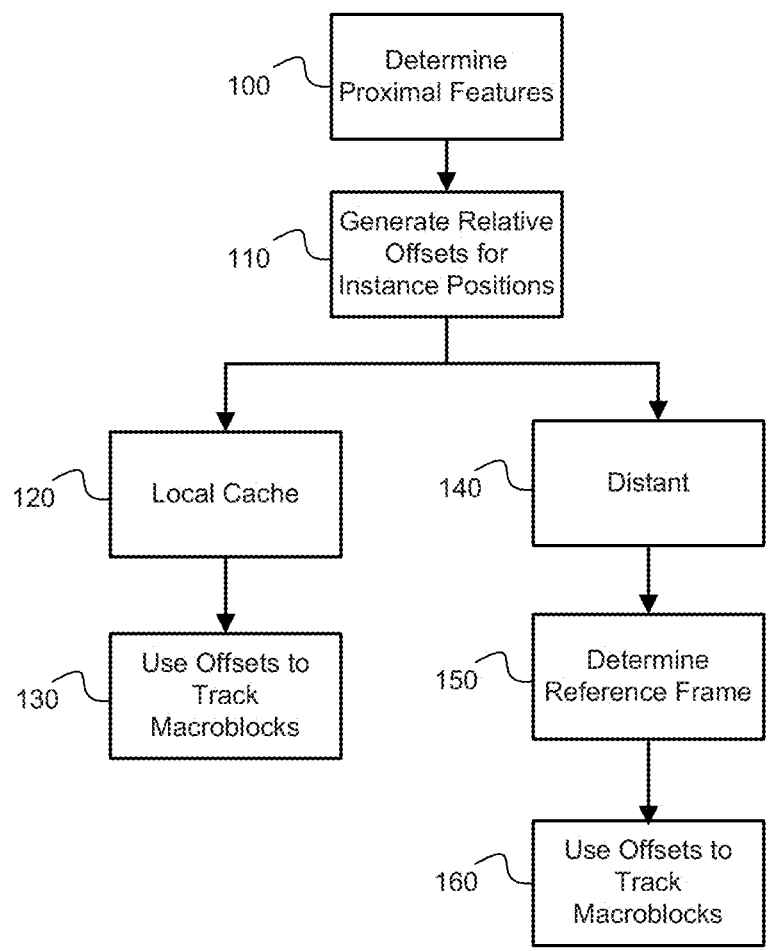
FIG. 1C is a block diagram illustrating the steps in relating features to nearby macroblocks and using the tracks of those features to generate good predictions for those macroblocks, according to an embodiment of the invention.

In one embodiment of the invention, feature tracks are used to relate features to macroblocks. The general steps for this are depicted in FIG. 1C. A given feature track indicates the location of a feature across frames, and there is an associated motion of that feature across frames. Using the location of the feature in the two most recent frames prior to the current frame, one can project the position of the feature in the current frame. This projected feature position then has an associated nearest macroblock, defined as the macroblock having greatest overlap with the projected feature position. This macroblock (now the target macroblock that is being encoded) has been associated to a specific feature track whose projected position in the current frame is nearby the macroblock (100 in FIG. 1C).

The next step is to calculate an offset 110 between the target macroblock and the projected feature position in the current frame. This offset can then be used to generate predictions for the target macroblock, using earlier feature instances in the associated feature's track. These earlier feature instances occupy either a local cache 120, comprised of recent reference frames where the feature appeared, or a distant cache 140, comprised of "older" reference frames 150 where the feature appeared. Predictions for the target macroblock can be generated by finding the regions in the reference frames with the same offsets (130, 160) from earlier feature instances as the offset between the target macroblock and the projected feature position in the current frame.

Generating Model-Based Primary and Secondary Predictions

In one embodiment of the present invention, feature-based prediction is implemented as follows: (1) detect the features for each frame; (2) model the detected features; (3) associate features in different frames to create feature tracks; (4) use feature tracks to predict feature locations in the "current" frame being encoded; (5) associate macroblocks in the current frame that are nearby the predicted feature locations; (6) generate predictions for the macroblocks in Step 5 based on past locations along the feature tracks of their associated features.

In one embodiment, features are detected using the SURF algorithm and they are associated and tracked using the FPA algorithm, as detailed in the previous section. Once features have been detected, associated, and tracked, the feature tracks can be used to associate each feature track with a nearest macroblock, as detailed above. It is possible for a single macroblock to be associated with multiple features, so one embodiment selects the feature having maximum overlap with the macroblock as the associated feature for that macroblock.

Given a target macroblock (the current macroblock being encoded), its associated feature, and the feature track for that feature, a primary prediction for the target macroblock can be generated. Data pels for the primary prediction comes from the most recent frame (prior to the current frame) where the feature appears, henceforth referred to as the key frame. The primary prediction is generated after selecting a motion model and a pel sampling scheme. In one embodiment of the present invention, the motion model can be either "0th order," which assumes that the feature is stationary between the key frame and the current frame, or "1st order," which assumes that feature motion is linear between the 2nd-most recent reference frame, the key frame, and the current frame. In either case, the motion of the feature is applied (in the backwards temporal direction) to the associated macroblock in the current frame to obtain the prediction for the macroblock in the key frame. In one embodiment of the present invention, the pel sampling scheme can be either "direct," in which motion vectors are rounded to the nearest integer and pels for the primary prediction are taken directly from the key frame, or "indirect," in which the interpolation scheme from conventional compression such as H.264 is used to derive a motion-compensated primary prediction. Thus, the present invention can have four different types of primary prediction, depending on the motion model ($0^{th}$ or $1^{st}$ order) and the sampling scheme (direct or indirect).

In an alternative embodiment, data pels for the primary prediction do not have to come from the key frame (the most recent frame prior to the current frame where the feature occurs) but can be taken from any previous reference frame stored in the reference frame buffer. In this case, the primary prediction can still be calculated via $0^{th}$ or $1^{st}$ order motion models and through direct or indirect sampling schemes. In the case of the $1^{st}$ order motion model, linear motion is assumed between the current frame, the key frame, and the past reference frame.

Primary prediction can be refined by modeling local deformations through the process of subtiling. In the subtiling process, different motion vectors are calculated for different local regions of the macroblock. In one embodiment, subtiling can be done by dividing the 16×16 macroblock into two 8×16 regions, two 16×8 regions, four 8×8 quadrants, or even smaller partitions (4×8, 8×4, 4×4), and calculating motion vectors for each local region separately. In another embodiment, subtiling can be carried out in the Y/U/V color space domain by calculating predictions for the Y, U, and V color channels (or various partitions of them) separately.

In addition to the primary prediction for the target macroblock, one can also generate secondary predictions based on positions of the associated feature in reference frames prior to the key frame. In one embodiment, the offset from the target macroblock to the (projected) position of the associated feature in the current frame represents a motion vector that can be used to find secondary predictions from the feature's position in past reference frames. In this way, a large number of secondary predictions can be generated (one for each frame where the feature has appeared previously) for a given target macroblock that has an associated feature. In one embodiment, the number of secondary predictions can be limited by restricting the search to some reasonable number of past reference frames (for example, 25).

Composite Predictions

Once primary and secondary predictions have been generated for a target macroblock, the overall reconstruction of the target macroblock can be computed based on these predictions. In one embodiment, following conventional codecs, the reconstruction is based on the primary prediction only, henceforth referred to as primary-only (PO) reconstruction.

In another embodiment, the reconstruction is based on a composite prediction that sums the key prediction and a weighted version of one of the secondary predictions. This algorithm, henceforth referred to as PCA-Lite (PCA-L), involves the following steps:

1. Create the vectorized (1-D) versions of the target macroblock and primary prediction. These can then be denoted as the target vector t and primary vector p.
2. Subtract the primary vector from the target vector to compute a residual vector r.
3. Vectorize the set of secondary predictions to form vectors $s_i$ (Without loss of generality, assume that these secondary vectors have unit norm.) Then subtract the primary vector from all the secondary vectors to form the primary-subtracted set, $s_i$–p. This has the approximate effect of projecting off the primary vector from the secondary vectors.
4. For each secondary vector, calculate a weighting $c=r^T(s_i-p)$.
5. For each secondary vector, calculate the composite prediction as $\hat{t} p+c \cdot (s_i-p)$.

In general, the steps in the PCA-Lite algorithm approximate the operations in the well-known orthogonal matching pursuit algorithm [Pati, 1993], with the composite prediction meant to have non-redundant contributions from the primary and secondary predictions. In another embodiment, the PCA-Lite algorithm described above is modified so that the primary vector in Steps 3-5 above is replaced by the mean of the primary and the secondary vector. This modified algorithm is henceforth referred to as PCA-Lite-Mean.

The PCA-Lite algorithm provides a different type of composite prediction than the bi-prediction algorithms found in some standard codecs (and described in the "Background" section above). Standard bi-prediction algorithms employ a blending of multiple predictions based on temporal distance of the reference frames for the individual predictions to the current frame. By contrast, PCA-Lite blends multiple predictions into a composite prediction based on the contents of the individual predictions.

In another embodiment, the coefficients for the PCA-Lite algorithm can be computed over subtiles of a macroblock instead of over the entire macroblock. The benefit of this is similar to the benefit described above for calculating motion vectors over subtiles of the macroblock: calculating "local" coefficients over a subtile is potentially more "accurate" than calculating "global" coefficients over an entire macroblock. To perform the PCA-Lite coefficient calculation in subtile space, the target vector t, primary vector p, and secondary vectors $s_i$ are divided into subtiles (either region-based partitions such as 16×8, 8×16, 8×8, and smaller regions; or color-based partitions such as Y/U/V color channels) and Steps 1-5 above are repeated for each subtile. Thus, a larger number of coefficients are calculated (one for each subtile) and needed to be encoded; this is a tradeoff for the higher accuracy produced by the local coefficient calculation.

Note that the formation of composite predictions as described above does not require feature-based modeling; composite predictions can be formed from any set of multiple predictions for a given target macroblock. Feature-based modeling, however, provides a naturally-associated set of multiple predictions for a given target macroblock, and composite predictions provide an efficient way to combine the information from those multiple predictions.

Multiple Fidelity Data Modeling

Figure 2A:
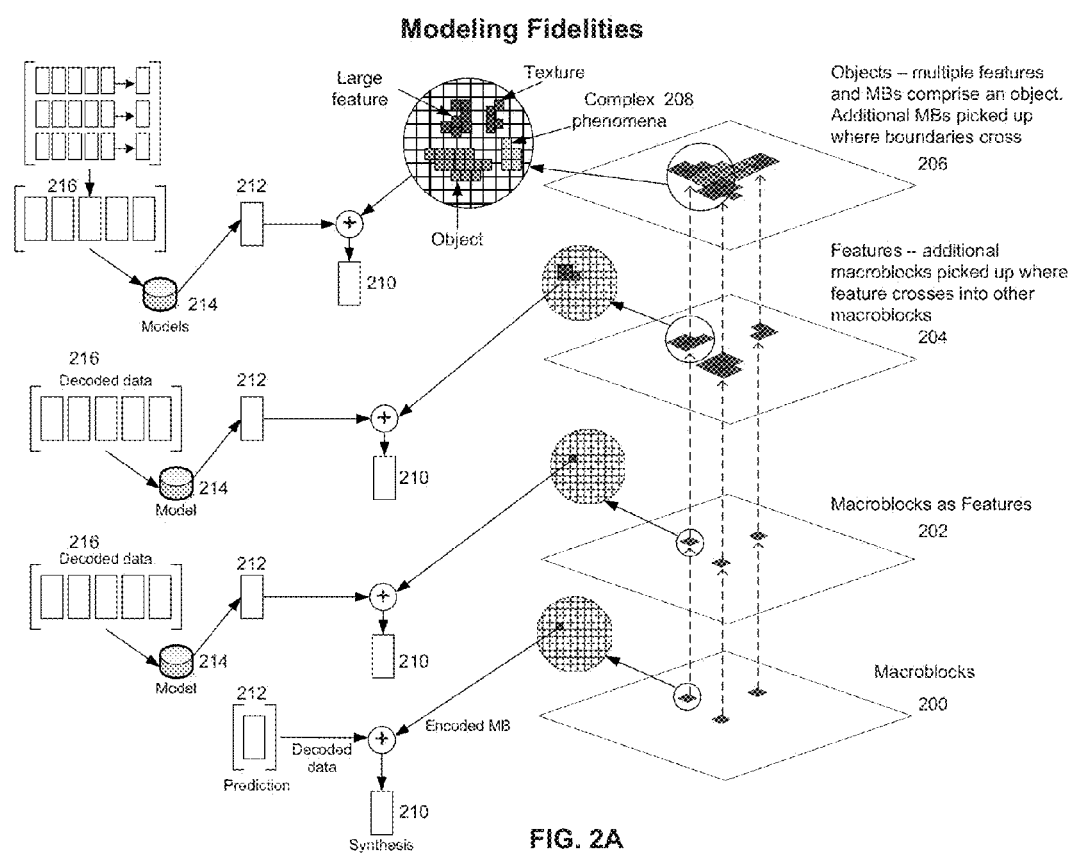
FIG. 2A is a schematic diagram illustrating the modeling of data at multiple fidelities to provide efficient encodings, according to an embodiment of the invention.

The current invention provides the ability to model the data at multiple fidelities for the purpose of model-based compression. One embodiment of this is illustrated in FIG. 2A, which displays four levels of modeling. These four levels are summarized in the following table and discussed in more detail below.

| | Size | Grid-Aligned | Can Span Multiple MBs | H.264 Motion Vector Predictors |
|---|---|---|---|---|
| Macroblocks | 16 × 16 | Yes | No | Yes |
| Macroblocks as Features | 16 × 16 | Yes | No | Yes |
| Features | 16 × 16 | No | Yes | Sometimes |
| Objects | Up to Frame Size | No | Yes | No |

The bottom level 200 in FIG. 2A is termed the "Macroblock" (MB) level and represents conventional compression partitioning frames into non-overlapping macroblocks, tiles of size 16×16, or a limited set of subtiles. Conventional compression (e.g., H.264) essentially employs no modeling; instead, it uses block-based motion estimation and compensation (BBMEC) to find predictions 212 for each tile from a limited search space in previously decoded reference frames. At the decoder, the predictions 212 are combined with residual encodings of the macroblocks (or subtiles) to synthesize 210 a reconstruction of the original data.

The second level 202 in FIG. 2A is termed the "Macroblocks as Features" (MBF) level and represents compression based on the MBC tracker described above and represented at 216 in FIG. 2A. Here, macroblocks (or subtiles of macroblocks) are treated as features, through recursive application of conventional BBMEC searches through previously encoded frames. The first application of BBMEC is identical to that of the MB level, finding a conventional prediction for the target macroblock from the most recent reference frame in 216. The second application of BBMEC, however, finds a conventional prediction for the first prediction by searching in the second-most-recent frame in 216. Repeated application of BBMEC through progressively older frames in 216 creates a "track" for the target macroblock, even though the latter has not been identified as a feature per se. The MBC track produces a model 214 that generates a prediction 212 that is combined with residual encodings of the macroblocks (or subtiles) to synthesize 210 a reconstruction of the original data at the decoder.

The third level 204 in FIG. 2A is termed the "Features" level and represents feature-based compression as described above. To review, features are detected and tracked independent of the macroblock grid, but features are associated with overlapping macroblocks and feature tracks are used to navigate previously-decoded reference frames 216 to find better matches for those overlapping macroblocks. If multiple features overlap a given target macroblock, the feature with greatest overlap is selected to model that target macroblock at 214. In an alternate embodiment, the codec could encode and decode the features directly, without relating the features to macroblocks, and process the "non-feature" background separately using, for example, MB-level conventional compression. The feature-based model 214 generates a prediction 212 that is combined with residual encodings of the associated macroblocks (or subtiles) to synthesize 210 a reconstruction of the original data at the decoder.

The top level 206 in FIG. 2A is termed the "Objects" level and represents object-based compression. Objects are essentially large features that may encompass multiple macroblocks and may represent something that has physical meaning (e.g., a face, a ball, or a cellphone) or complex phenomena 208. Object modeling is often parametric, where it is anticipated that an object will be of a certain type (e.g., a face), so that specialized basis functions can be used for the modeling 214. When objects encompass or overlap multiple macroblocks, a single motion vector 212 can be calculated for all of the macroblocks associated with the object 216, which can result in savings both in terms of computations and encoding size. The object-based model 214 generates a prediction 212 that is combined with residual encodings of the associated macroblocks (or subtiles) to synthesize 210 a reconstruction of the original data at the decoder.

Figure 2B:
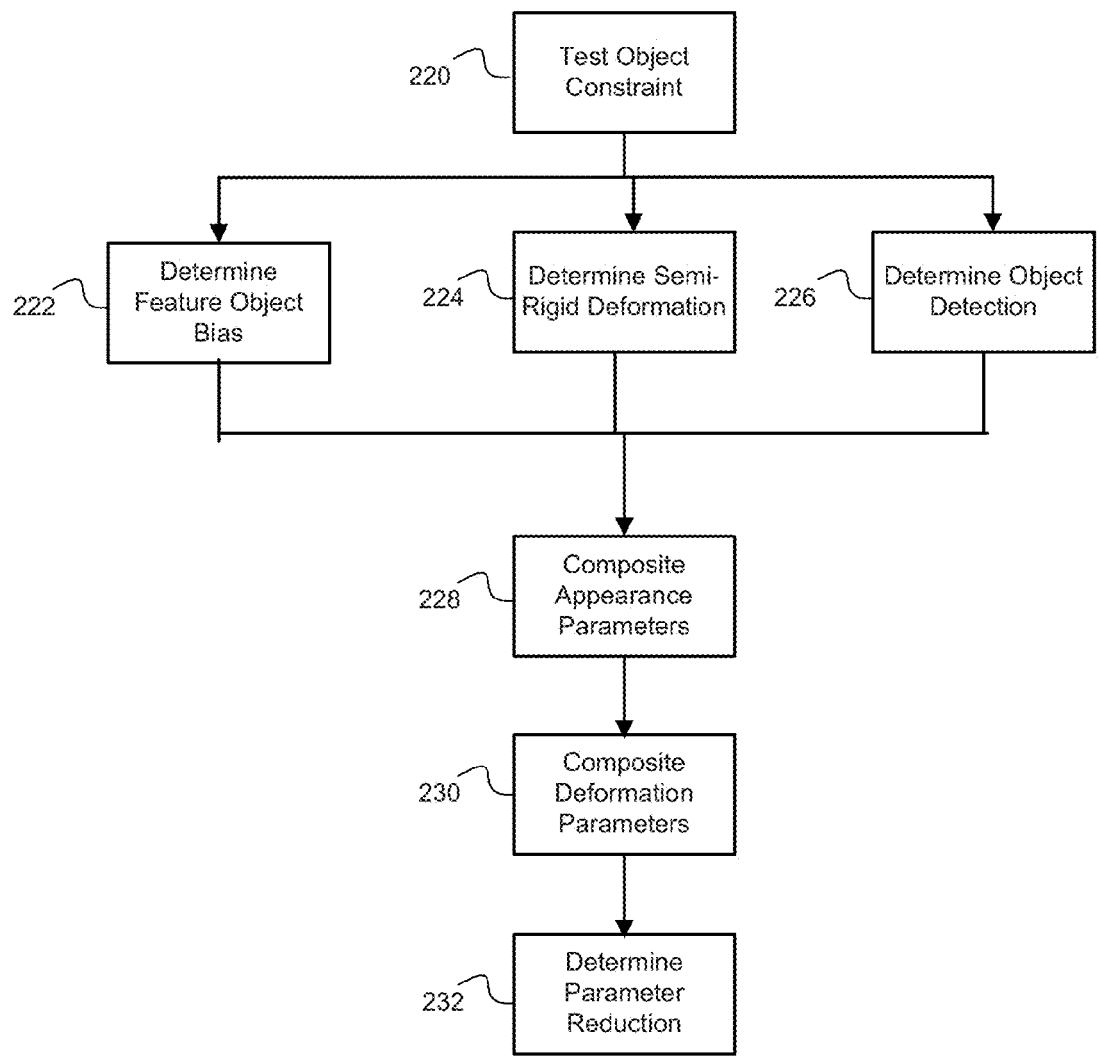
FIG. 2B is a block diagram illustrating the identification of objects through feature model correlation and aggregation, according to an embodiment of the invention.

In an alternate embodiment, objects may also be identified by correlating and aggregating nearby feature models 214. FIG. 2B is a block diagram illustrating this type of nonparametric or empirical object detection via feature model aggregation. A particular type of object 220 is detected by identifying which features have characteristics of that object type, or display "object bias" 222. Then, it is determined whether the set of features in 222 display a rigidity of the model states 224, a tendency over time for the features and their states to be correlated. If the individual feature models are determined to be correlated (in which case an object detection is determined 226), then a composite appearance model with accompanying parameters 228 and a composite deformation model with accompanying parameters 230 can be formed. The formation of composite appearance and deformation models evokes a natural parameter reduction 232 from the collective individual appearance and deformation models.

Figure 2C:
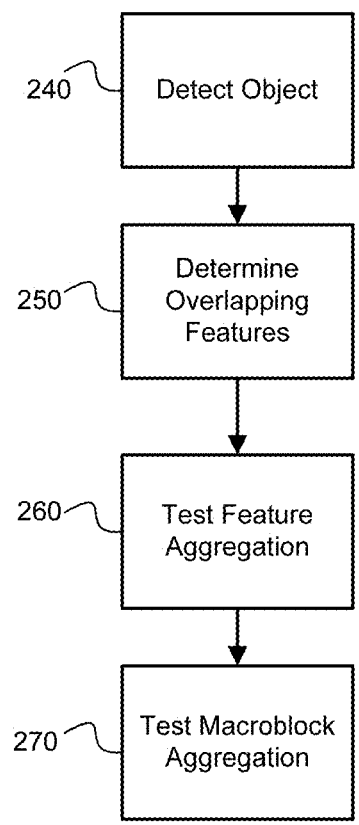
FIG. 2C is a block diagram illustrating the identification of objects via aggregation of both nearby features and nearby macroblocks, according to an embodiment of the invention.

FIG. 2C illustrates a third embodiment of the "Objects" level 206 in FIG. 2A, employing both parametric and nonparametric object-based modeling. A parametrically modeled object is detected 240. The detected object 240 may be processed to determine if there are any overlapping features 250. The set of overlapping features may then be tested 260 to determine whether they can be aggregated as above. If aggregation of the overlapping features fails, then the process reverts to testing the macroblocks overlapping the detected object 240, to determine whether they can be effectively aggregated 270 to share a common motion vector, as noted above.

A multiple-fidelity processing architecture may use any combination of levels 200, 202, 204, 206 to achieve the most advantageous processing. In one embodiment, all levels in FIG. 2A are examined in a "competition" to determine which levels produce the best (smallest) encodings for each macroblock to be encoded. More details on how this "competition" is conducted follow below.

In another embodiment, the levels in FIG. 2A could be examined sequentially, from bottom (simplest) to top (most complex). If a lower-level solution is deemed satisfactory, higher-level solutions do not have to be examined. Metrics for determining whether a given solution can be deemed "good enough" are described in more detail below.

Model-Based Compression Codec
Standard Codec Processing

The encoding process may convert video data into a compressed, or encoded, format. Likewise, the decompression process, or decoding process, may convert compressed video back into an uncompressed, or raw, format. The video compression and decompression processes may be implemented as an encoder/decoder pair commonly referred to as a codec.

Figure 3A:
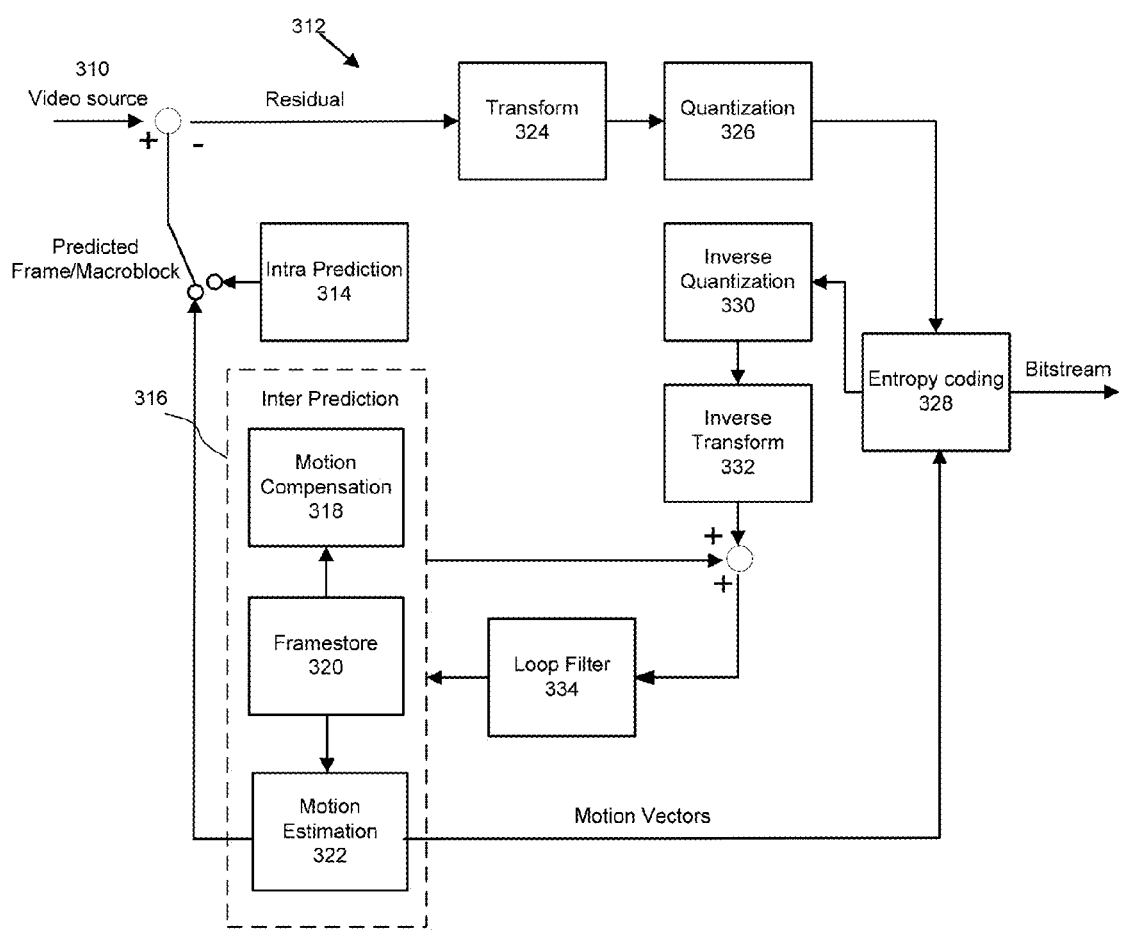
FIG. 3A is a schematic diagram of the configuration of an example transform-based codec according to an embodiment of the invention.

FIG. 3A is a block diagram of a standard encoder 312. The encoder in FIG. 3A may be implemented in a software or hardware environment, or combination thereof. Components of the example encoder may be implemented as executable code stored on a storage medium, such as one of those shown in FIGS. 8A and 8B, and configured for execution by one or more of processors 820. The encoder 312 may include any combination of components, including, but not limited to, an intra-prediction module 314, an inter-prediction module 316, a transform module 324, a quantization module 326, an entropy encoding module 328 and a loop filter 334. The inter prediction module 316 may include a motion compensation module 318, frame storage module 320, and motion estimation module 322. The encoder 312 may further include an inverse quantization module 330, and an inverse transform module 332. The function of each of the components of the encoder 312 shown in FIG. 3A is well known to one of ordinary skill in the art.

The entropy coding algorithm 328 in FIG. 3A may be based on a probability distribution that measures the likelihood of different values of quantized transform coefficients. The encoding size of the current coding unit (e.g., macroblock) depends on the current encoding state (values of different quantities to be encoded) and the relative conformance of the state to the probability distribution. Any changes to this encoding state, as detailed below, may impact encoding sizes of coding units in subsequent frames. To fully optimize an encoding of a video, an exhaustive search may be conducted of all the possible paths on which the video can be encoded (i.e., all possible encoding states), but this is computationally prohibitive. In one embodiment of the current invention, the encoder 312 is configured to focus on the current (target) macroblock, so that optimization is applied locally, rather than considering a larger scope, (e.g., over a slice, a frame, or a set of frames).

Figure 3B:
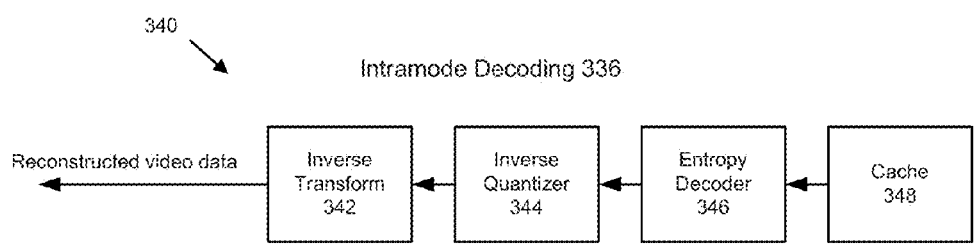
FIG. 3B is a block diagram of an example decoder for intra-predicted macroblocks, according to an embodiment of the invention.
Figure 3C:
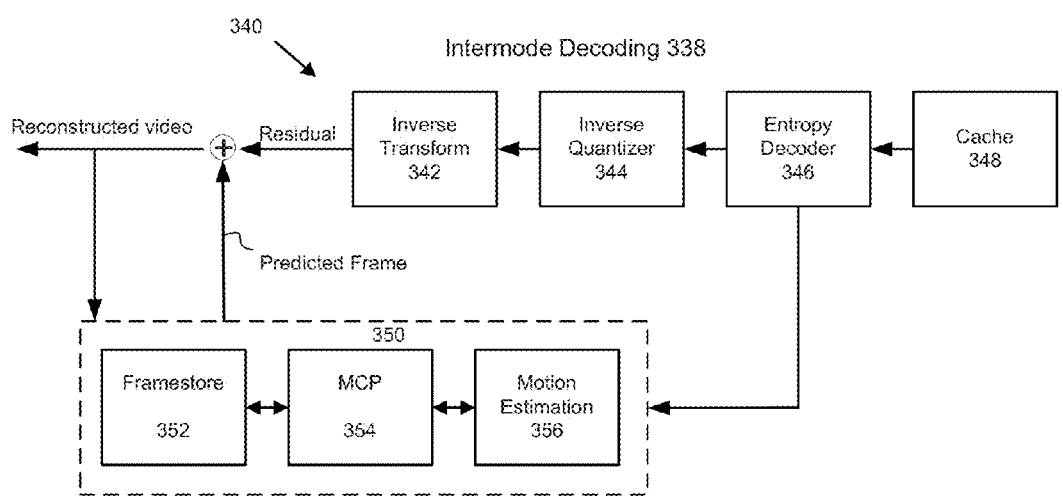
FIG. 3C is a block diagram of an example decoder for inter-predicted macroblocks, according to an embodiment of the invention.

FIGS. 3B and 3C are block diagrams of a standard decoder 340 providing decoding of intra-predicted data 336 and decoding of inter-predicted data 338, respectively. The decoder 340 may be implemented in a software or hardware environment, or combination thereof. Referring to FIGS. 3A, 3B, and 3C, the encoder 312 typically receives the video input 310 from an internal or external source, encodes the data, and stores the encoded data in the decoder cache/buffer 348. The decoder 340 retrieves the encoded data from the cache/buffer 348 for decoding and transmission. The decoder may obtain access to the decoded data from any available means, such as a system bus or network interface. The decoder 340 can be configured to decode the video data to decompress the predicted frames and key frames (generally at 210 in FIG. 2A). The cache/buffer 348 can receive the data related to the compressed video sequence/bitstream and make information available to the entropy decoder 346. The entropy decoder 346 processes the bitstream to generate estimates of quantized transform coefficients for the intra-prediction in FIG. 3A or the residual signal in FIG. 3B. The inverse quantizer 344 performs a rescaling operation to produce estimated transform coefficients, and the inverse transform 342 is then applied to the estimated transform coefficients to create a synthesis of the intra-prediction of the original video data pels in FIG. 3A or of the residual signal in FIG. 3B. In FIG. 3B, the synthesized residual signal is added back to the inter-prediction of the target macroblock to generate the full reconstruction of the target macroblock. The inter-prediction module 350 replicates at the decoder the inter-prediction generated by the encoder, making use of motion estimation 356 and motion compensation 354 applied to reference frames contained in the framestore 352. The decoder's inter-prediction module 350 mirrors the encoder's inter-prediction module 316 in FIG. 3A, with its components of motion estimation 322, motion compensation 318, and framestore 320.

Hybrid Codec Implementing Model-Based Prediction

Figure 3D:
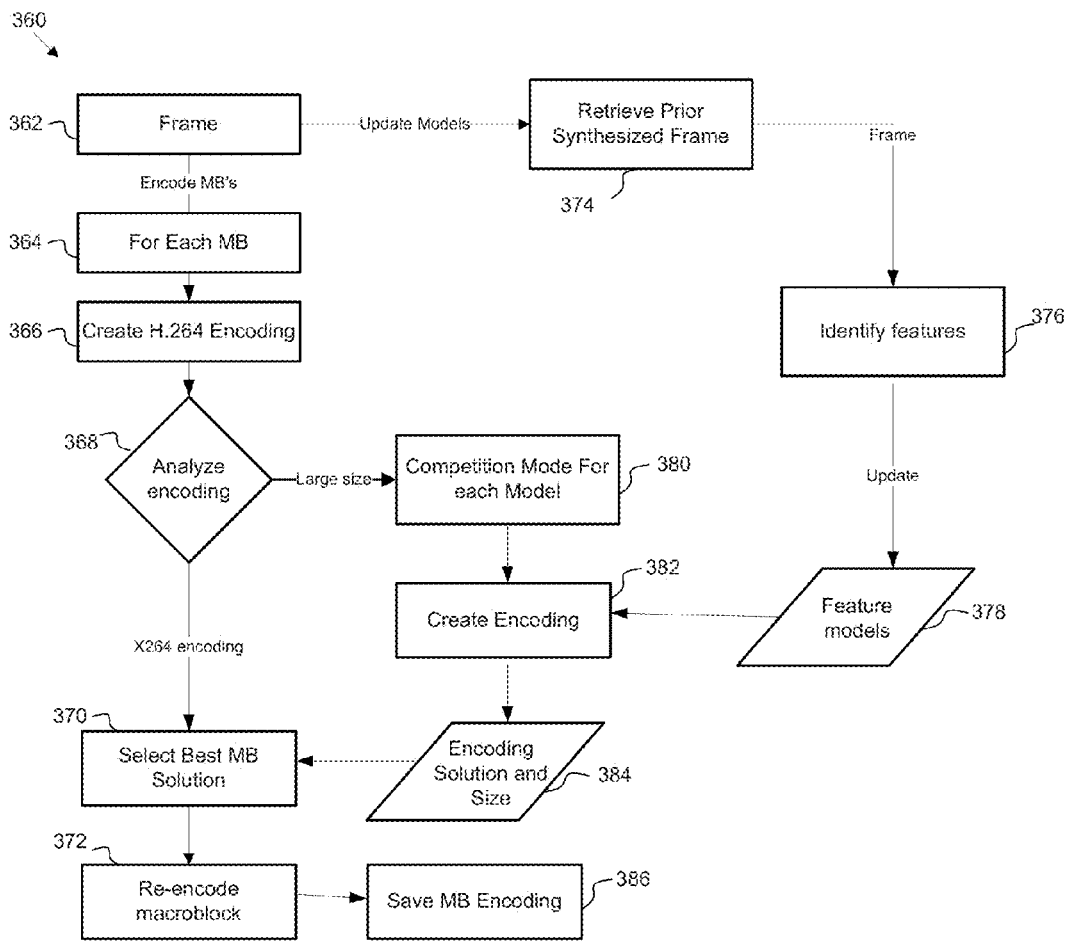
FIG. 3D is a schematic diagram of the configuration of an example transform based codec employing feature-based prediction, according to an embodiment of the invention.

FIG. 3D is a diagram of an example encoder according to an embodiment of the invention that implements model-based prediction, the framework for which is henceforth referred to as a model-based compression framework (MBCF). At 362, the MBCF encoder 360 can be configured to encode a current (target) frame. At 364, each macroblock in the frame can be encoded, such that, at 366, a standard H.264 encoding process is used to define a base (first) encoding that yields an H.264 encoding solution. In one preferred embodiment, the encoder 366 is an H.264 encoder capable of encoding a Group of Pictures (set of reference frames). Further, the H.264 encoder preferably is configurable so that it can apply different methods to encode pels within each frame, i.e., intra-frame and inter-frame prediction, with inter-frame prediction able to search multiple reference frames for good matches for the macroblock being encoded. Preferably, the error between the original macroblock data and the prediction is transformed, quantized, and entropy-encoded.

Preferably, the encoder 360 utilizes the CABAC entropy encoding algorithm at 382 to provide a context-sensitive, adaptive mechanism for context modeling. The context modeling may be applied to a binarized sequence of the syntactical elements of the video data such as block types, motion vectors, and quantized coefficients, with the binarization process using predefined mechanisms. Each element is then coded using either adaptive or fixed probability models. Context values can be used for appropriate adaptations of the probability models.

While standard H.264 encoders encode motion vectors differentially with respect to neighboring, previously-decoded motion vectors, the MBCF encodes motion vectors differentially with respect to a "global" motion vector derived from the tracker (whether FPA, MBC, SURF or other tracker known in the art). One of the benefits of running a tracker is that this global motion vector is available as a by-product.

Competition Mode

In FIG. 3D, at 368, the H.264 macroblock encoding is analyzed. At 368, if the H.264 encoding of the macroblock is judged to be "efficient," then the H.264 solution is deemed to be close to ideal, no further analysis is performed, and the H.264 encoding solution is accepted for the target macroblock. In one embodiment, efficiency of the H.264 encoding can be judged by comparing the H.264 encoding size (in bits) to a threshold, which can be derived from percentile statistics from previously encoded videos or from earlier in the same video. In another embodiment, efficiency of the H.264 encoding can be judged by determining whether an H.264 encoder has declared the target macroblock a "skip" macroblock, in which the data in and around the target macroblock is uniform enough that the target macroblock essentially requires no additional encoding.

At 368, if the H.264 macroblock solution is not considered efficient, then additional analysis is performed, and the encoder enters Competition Mode 380. In this mode, several different predictions are generated for the target macroblock, based on multiple models 378. The models 378 are created from the identification of features 376 detected and tracked in prior frames 374. Note that as each new frame 362 is processed (encoded and then decoded and placed into framestore), the feature models need to be updated to account for new feature detections and associated feature track extensions in the new frame 362. The model-based solutions 382 are ranked based on their encoding sizes 384, along with the H.264 solution acquired previously. Because of its flexibility to encode a given macroblock using either a base encoding (the H.264 solution) or a model-based encoding, the present invention is termed a hybrid codec.

For example, in Competition Mode, an H.264 encoding is generated for the target macroblock to compare its compression efficiency (ability to encode data with a small number of bits) relative to other modes. Then for each encoding algorithm used in Competition Mode, the following steps are executed: (1) generate a prediction based on the codec mode/algorithm used; (2) subtract the prediction from the target macroblock to generate a residual signal; (3) transform the residual (target minus prediction) using an approximation of a 2-D block-based DCT; (4) encode the transform coefficients using an entropy encoder.

In some respects, the baseline H.264 (inter-frame) prediction can be thought of as based on a relatively simple, limited model (H.264 is one of the algorithms used in Competition Mode). However, the predictions of the encoder 360 can be based on more complex models, which are either feature-based or object-based, and the corresponding tracking of those models. If a macroblock exhibiting data complexity is detected, the encoder 360 operates under the assumption that feature-based compression can do a better job than conventional compression.

Use of Feature-Based Predictions in Competition Mode

As noted above, for each target macroblock, the MBCF encoder makes an initial determination as to whether the H.264 solution (prediction) is efficient ("good enough") for that macroblock. If the answer is negative, Competition Mode is entered.

In FIG. 3D for Competition Mode 380, the "entries" into the competition are determined by the various processing choices for feature-based prediction described above. Each entry comprises a different prediction for the target macroblock. Full description of the invention's feature-based prediction requires specification of the following processing choices:

tracker type (FPA, MBC, SURF)
motion model for primary prediction ($0^{th}$ or $1^{st}$ order)
sampling scheme for primary prediction (direct or indirect)
subtiling scheme for motion vector calculation (no subtiling, local regions, color channels)
reconstruction algorithm (PO or PCA-L)
subtiling scheme for PCA-L coefficient calculation (no subtiling, local regions, color channels)
reference frame for primary prediction (PO or PCA-L)
reference frames for secondary prediction (for PCA-L).

The solution search space for a given target macroblock is comprised of all of the invention's feature-based predictions represented above, plus the H.264 solution (the "best" inter-frame prediction from H.264). In one embodiment, Competition Mode includes all possible combinations of processing choices noted above (tracker type, motion model and sampling scheme for primary prediction, subtiling scheme, and reconstruction algorithms). In another embodiment, the processing choices in Competition Mode are configurable and can be limited to a reasonable subset of possible processing combinations to save computations.

In an alternative embodiment, the MBCF may be modified so that the resulting bitstream of the encoder is H.264-compliant, meaning that the bitstream can be interpreted (decoded) by any standard H.264 decoder. In this standards-compliant MBCF (SC-MBCF), the processing options available to the Competition Mode are limited to those whose encodings can be interpreted within a standard H.264 bitstream. The available processing options in the SC-MBCF are:

tracker type (FPA, MBC, SURF, or other known tracker)
motion model for primary prediction ($0^{th}$ or $1^{st}$ order)
sampling scheme for primary prediction (indirect only)
subtiling for motion vector calculation (local regions, color channels)
reconstruction algorithm (PO only)
reference frame for primary prediction.

In particular, standard H.264 decoders cannot interpret the additional coefficients required by the PCA-Lite algorithm variations, so the primary-only (PO) algorithm is the sole reconstruction algorithm available. For the (nonstandard) MBCF, the CABAC context for entropy encoded must be modified to accommodate the additional PCA-Lite coefficients, among other quantities; for the SC-MBCF, no such accommodation is necessary and standard H.264 CABAC context are used.

Potential solutions for the competition are evaluated one at a time by following the four steps noted previously: (1) generate the prediction; (2) subtract the prediction from the target macroblock to generate a residual signal; (3) transform the residual; (4) encode the transform coefficients using an entropy encoder. In FIG. 3D the output of the last step, 382 is a number of bits associated with a given solution 384. After each solution is evaluated, the encoder is rolled back to its state prior to that evaluation, so that the next solution can be evaluated. In one embodiment, after all solutions have been evaluated, a "winner" for the competition is chosen 370 by selecting the one with smallest encoding size. The winning solution is then sent to the encoder once more 372 as the final encoding for the target macroblock. As noted above, this winning solution is a locally-optimum solution, as it is optimum for the target macroblock only. In an alternate embodiment, the selection of the optimal solution is hedged against larger scale encoding tradeoffs that include, but are not limited to, context intra-frame prediction feedback and residual error effects in future frames.

Information pertaining to the winning solution is saved into the encoding stream 386 and transmitted/stored for future decoding. This information may include, but is not limited to, the processing choices noted above for feature-based prediction (e.g., tracker type, primary prediction, subtiling scheme, reconstruction algorithm, etc.).

In some cases, the encoder 360 may determine that the target macroblock is not efficiently coded by H.264, but there is also no detected feature that overlaps with that macroblock. In this case, the encoder uses H.264 anyway to encode the macroblock as a last resort. In an alternate embodiment, the tracks from the feature tracker can be extended to generate a pseudo-feature that can overlap the macroblock and thus produce a feature-based prediction.

In one embodiment, movement among the four levels in FIG. 2A is governed by Competition Mode.

Decoding Using Feature-Based Predictions

Figure 4:
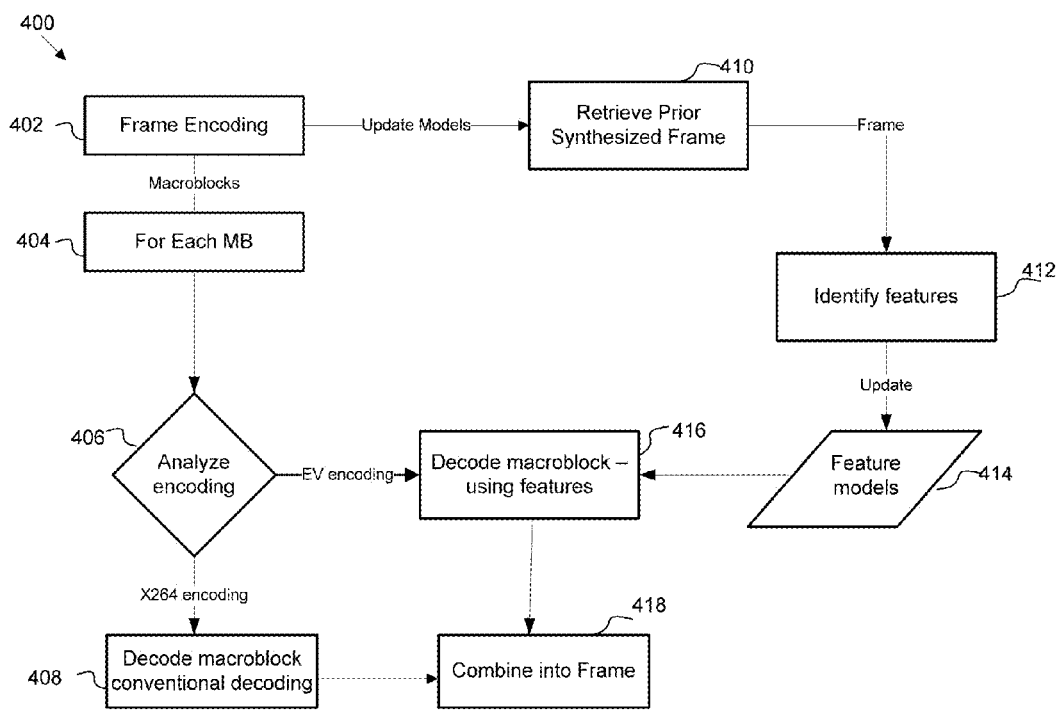
FIG. 4 is a block diagram of an example decoder within a feature-based prediction framework, according to an embodiment of the invention.

FIG. 4 is a diagram of an example decoder according to an embodiment of the invention implementing model-based prediction within the Assignee's EuclidVision codec. The decoder 400 decodes the encoded video bitstream to synthesize an approximation of the input video frame that generated the frame encoding 402. The frame encoding 402 includes a set of parameters used by the decoder 400 to reconstruct its corresponding video frame 418.

The decoder 400 traverses each frame with the same slice ordering used by the encoder, and the decoder traverses each slice with the same macroblock ordering used by the encoder. For each macroblock 404, the decoder follows the same process as the encoder, determining 406 whether to decode the macroblock conventionally 408 or whether to decode the macroblock utilizing feature models and parameters at 416. If a macroblock was encoded via the invention's model-based prediction (within its model-based compression framework [MBCF]), the decoder 400 extracts whatever feature information (feature tracks, feature reference frames [GOP], feature motion vectors) is needed to reproduce the prediction for that solution 418. The decoder updates feature models (410, 412, 414) during the decoding so they are synchronized with the encoder feature state for the particular frame/slice/macroblock that is being processed. The need to run the feature detector 410 and tracker 414 at the decoder is non-standard but necessary to re-create the tracker-based global motion vectors for differential encoding of motion vectors.

In an alternative embodiment, within the standards-compliant MBCF (SC-MBCF), feature information is not used directly to encode model-based predictions. Instead, feature information identifies particular motion vectors and corresponding regions for primary prediction, and the motion vectors are encoded directly (or differentially with respect to neighboring motion vectors, as in standard H.264 encoders) into the bitstream. In this case, the decoder 400 never needs to extract additional feature information 416 but is always able to decode the macroblock conventionally at 408. Thus, in the SC-MBCF, the decoders are standard H.264 decoders that do not run feature detection and tracking.

Note that, because of memory limitations, conventional codecs do not typically retain the entire prediction context for decoded frames in the framestore 352 and cache 348 of FIG. 3C, but only the frames (pels) themselves. By contrast, the invention extends the prediction context stored in the framestore 352 and cache 348 of FIG. 3C by prioritizing retention of feature-based models and parameters.

Figure 5:
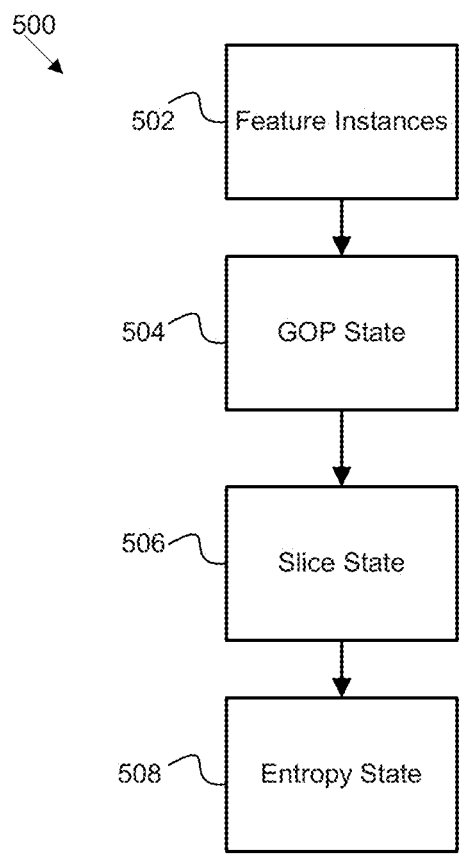
FIG. 5 is a block diagram illustrating the state isolation process of feature instances according to an embodiment of the present information.

The full set of parameters that describe a feature model is known as the state of the feature, and this state must be isolated to retain feature models effectively. FIG. 5 is a block diagram illustrating the state isolation process 500 of feature instances according to an embodiment of the present invention. This state isolation information can be associated with a target macroblock and include parameters associated with relevant feature instances 502 that can be of assistance in the encoding of that target macroblock. The state isolation information can be also used to interpolate predicted features in future video frames. Each respective feature instance has an associated GOP 504. Each GOP includes respective state information regarding, for example, respective boundary information. The respective state isolation information of a feature instance may further include state information about any relevant associated objects, their respective slice parameters 506, and their respective entropy state 508. In this way, the state information provides instructions regarding the boundaries of GOP/slice/entropy parameters of feature instances and their corresponding extensions into new states and state contexts. The state information 506, 508 can be used to predict and interpolate the state of a predicted feature in future frames.

Together, the macroblock data (pels) and state isolation information from associated features form an extended prediction context. Extended contexts from multiple feature instances and their previously decoded neighbors may be combined. The extended prediction context for the encoder 312 in FIG. 3A and decoder 340 in FIGS. 3B and 3C may include, but is not limited to: (1) one or more macroblocks, (2) one or more neighboring macroblocks, (3) slice information, (4) reference frames [GOP], (5) one or more feature instances, (6) object/texture information.

Cache Organization and Access of Feature Model Information

During the process of generating feature models, it is often the case that multiple instances of a specific feature are found in a given video. In this case, the feature model information can be stored or cached efficiently by organizing the model information prior to caching. This technique can be applied to both parametric and nonparametric model-based compression schemes.

In FIG. 3C, for example, if it is determined that the use of feature-based modeling prediction context information improves compression efficiency, the cache 348 (including the framestore 352) can be configured to include feature-based modeling prediction context information. Attempts to access uncached feature-based prediction context data can generate overhead that degrades the system's responsiveness and determinism. This overhead can be minimized by caching, ahead of time, the preprocessed feature-based encoding prediction context. Doing this provides a means by which much of the repetition of accessing data related to the feature-based prediction context can be avoided.

The encoder 312/decoder 340 (FIGS. 3A, 3C) can be configured using, for example, a cache that is adapted to increase the execution speed and efficiency of video processing. The performance of the video processing may depend upon the ability to store, in the cache, feature-based encoding prediction data such that it is nearby in the cache to the associated encoded video data, even if that encoded video data is not spatially close to the frame(s) from which the feature-based encoding prediction data was originally derived. Cache proximity is associated with the access latency, operational delay, and transmission times for the data. For example, if the feature data from a multitude of frames is contained in a small amount of physical memory and accessed in that form, this is much more efficient than accessing the frames from which those features were derived on a persistent storage device. The encoder 312/decoder 340 (FIGS. 3A, 3C) may include a configurator that stores the prediction data in the cache in such a way to ensure that, when a macroblock or frame is decoded, the feature-based prediction context information is easily accessible from the cache/buffer/framestore.

Figure 6:
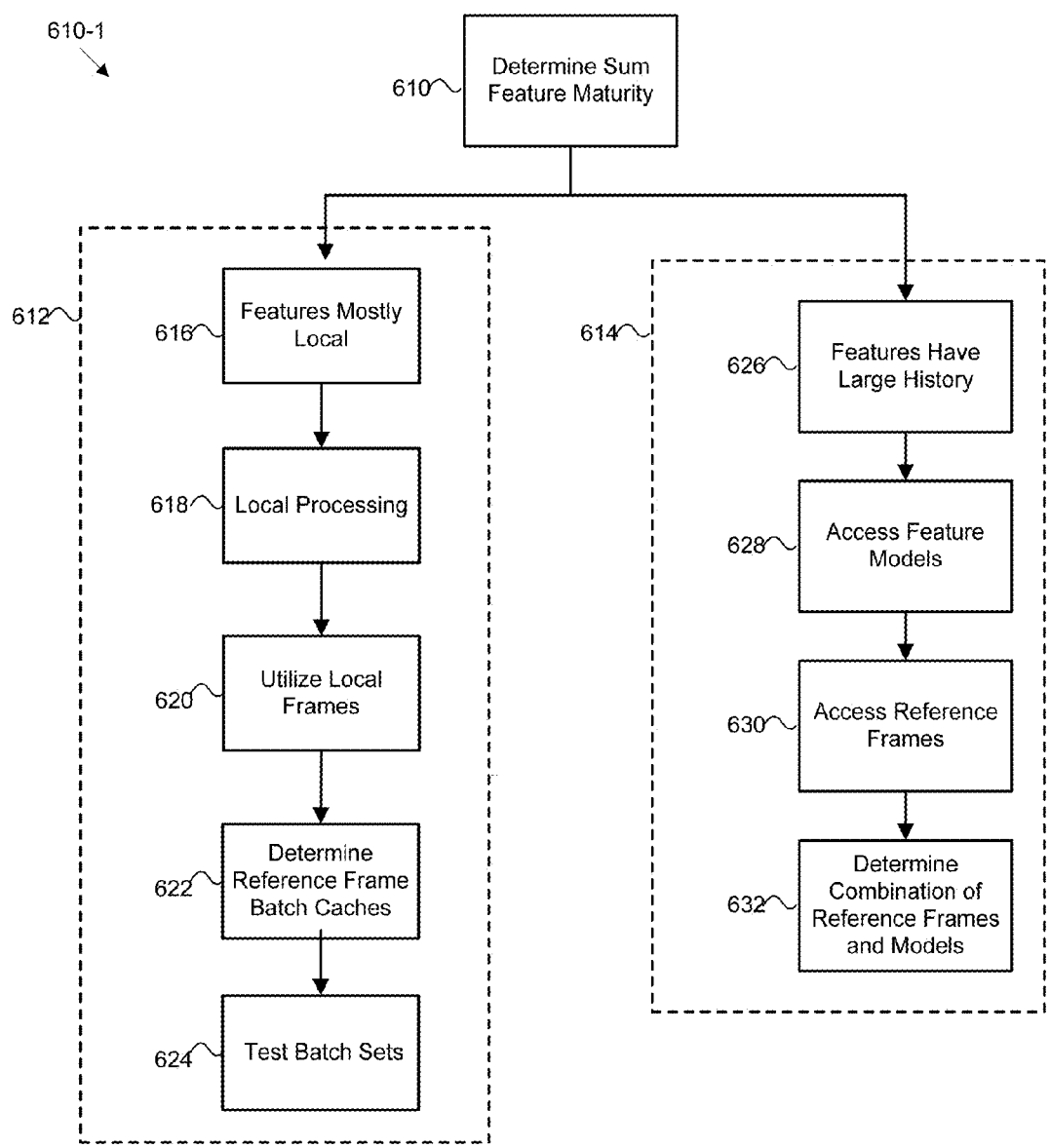
FIG. 6 is a block diagram illustrating an overview of example cache architecture according to an embodiment of the invention.

Certain embodiments of the present invention can extend the cache by first defining two categories of feature correlation in the previously decoded frames, namely local and non-local previously decoded data for the cache. The local cache can be a set of previously decoded frames that are accessible in batches, or groups of frames, but the particular frames that constitute those groups are determined by detected features. The local cache is driven by features detected in the current frame. The local cache is used to a greater extent when there are relatively few "strong" feature models (models having a long history) for the current frame/macroblock. The local cache processing is based on batch motion compensated prediction, and groups of frames are stored in reference frame buffers. FIG. 6 is a block diagram illustrating an overview of example cache architecture 610-1 according to an embodiment of the invention. The cache access architecture 610-1 includes the decision processes 610 for local cache access 612 (616, 618, 620, 622, and 624) and distant cache access 614 (626, 628, 630, and 632). If the features are mostly local 612 (for example, there are few strong feature models for the current frame/macroblock), then local cache processing 618 is provided.

Figure 7A:
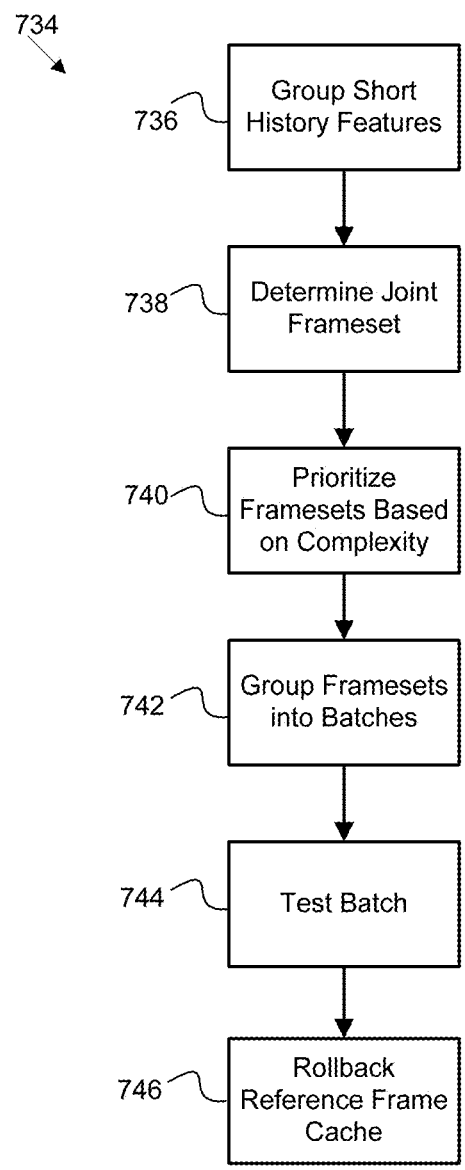
FIG. 7A is a block diagram illustrating the processing involved in utilizing the local (short) cache data, according to an embodiment of the invention.

FIG. 7A is a block diagram illustrating the processing involved in utilizing the local (short) cache data 734. The local cache can be a set of previously decoded frames that are accessible in batches, or groups of frames, but the particular frames that constitute those groups are determined by detected features. The local cache 734 in FIG. 7A groups only "short history" features 736, those whose tracks only comprise a small number of frames. The aggregate set of frames encompassed by the short history features determines a joint frameset 738 for those features. Frames in the joint frameset 738 may be prioritized 740 based on the complexity of the feature tracks in the respective frames. In one embodiment, complexity may be determined by the encoding cost of the features from a base encoding process such as H.264. Referring to FIGS. 3B, 3C, 6, and 7A, the local cache may be stored in the framestore 352 or in the cache buffer 348. The locally cached frames are utilized at 620. A GOP/batch 742 based on detected feature instances can then be formed at 622. The GOP/batch based on detected feature instances can be tested at 624 as reference frames 744 for the motion compensation prediction process. Motion compensated prediction done in this way can be said to be "biased" toward feature tracking information, because the reference frames for the motion estimation are the frames with previously-detected feature instances. At 746, additional rollback capabilities are provided to test the applicability of the residual modeling within the GOP/batch, slice, and entropy state. In this way, reference frames that are remote in the video frame sequence to the current frame being encoded can be evaluated more efficiently.

Thus, certain embodiments of the invention are able to apply analysis to past frames to determine the frames that will have the highest probability of providing matches for the current frame. Additionally, the number of reference frames can be much greater than the typical one-to-sixteen reference frame maximum found in conventional compression. Depending on system resources, the reference frames may number up to the limit of system memory, assuming that there are a sufficient number of useful matches in those frames. Further, the intermediate form of the data generated by the present invention can reduce the required amount of memory for storing the same number of reference frames.

When the features have an extensive history 626 in FIG. 6, features are located in storage that is mostly in the non-local/distant cache. The non-local cache is based on two different cache access methods, frame and retained. The frame access of the non-local cache accesses frames directly to create feature models that are then utilized to encode the current frame. The retained mode does not access the previously decoded data directly, but rather utilizes feature models that have been retained as data derived from those previously decoded frames (the feature model and the parameters of the instances of the feature model in those frames) and thereby can be used to synthesize that same data. At 628, the models for the feature instances are accessed. At 630, the reference frames are accessed, and at 632 the combination of optimal reference frames and models are marked for use. Criteria for optimality are based on intermediate feature information for the feature models in each reference frame, including feature strength and feature bandwidth.

The distant cache 614 can be any previously decoded data (or encoded data) that is preferably accessible in the decoder state. The cache may include, for example, reference frames/GOPs, which are generally a number of frames that precede the current frame being encoded. The decoder cache allows for other combinations of previously decoded frames to be available for decoding the current frame.

Figure 7B:
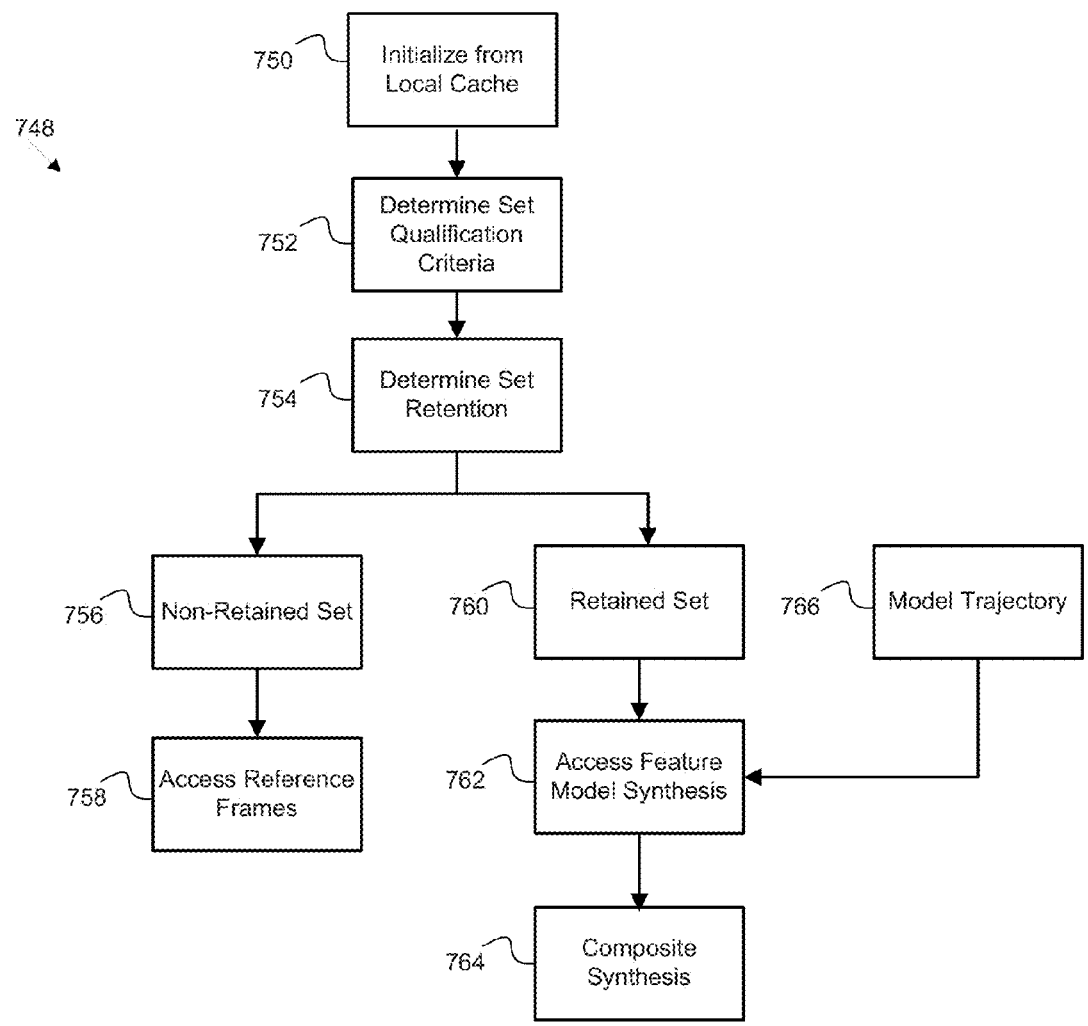
FIG. 7B is a block diagram illustrating the processing involved in utilizing the distant cache data, according to an embodiment of the invention.

FIG. 7B is a block diagram illustrating the processing involved in utilizing the distant cache data. The distant (non-local) cache 748 illustrates the longer range cache architecture. The distant cache is initialized from the local cache 750 in response to a determination 752 that the detected features have an extensive history (many reoccurrences). The process then determines which retention mode 754 is used. The two modes of the non-local cache are the retained 760 and non-retained 756. The non-retained 756 is a conventional motion compensated prediction process augmented with predictions based on feature models (similar to the usage of implicit modeling for the hybrid codec described above). The non-retained mode 756 thus accesses 758 reference frames to obtain working predictions. The retained mode is similar to the non-retained mode, but it uses predictions that come explicitly from the feature model itself 762, 766. The retained model necessarily limits the prediction searches to that data for which the feature model is able to synthesize the feature that it models. Further, the feature model may contain the instance parameterizations for the feature's instances in prior frames, which would be equivalent to the pels contained in those prior frames. The interpolation of the function describing those parameters is also used to provide predictions to the motion compensation prediction process to facilitate frame synthesis 764.

Digital Processing Environment and Communication Network

Figure 8A:
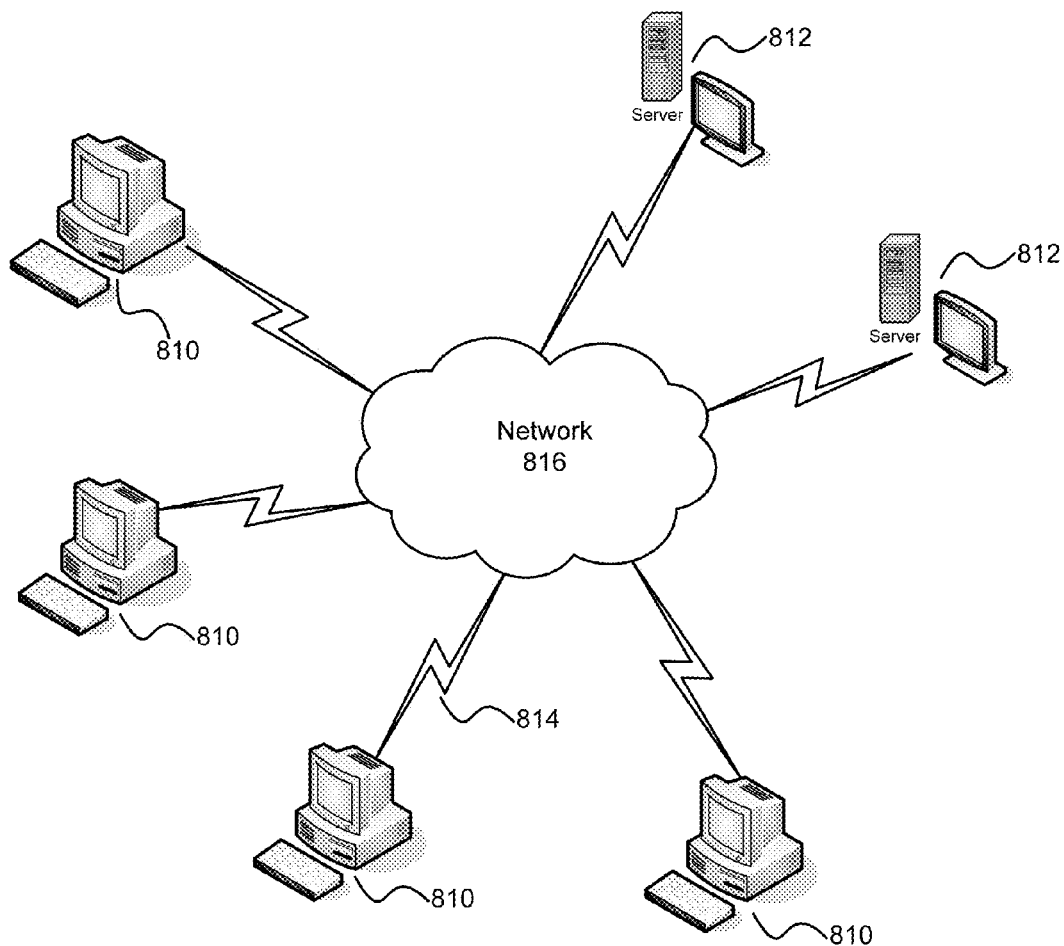
FIG. 8A is a schematic diagram of a computer network environment in which embodiments are deployed.

Example implementations of the present invention may be implemented in a software, firmware, or hardware environment. In an embodiment, FIG. 8A illustrates one such environment. Client computer(s)/devices 810 and a cloud 812 (or server computer or cluster thereof) provide processing, storage, and input/output devices executing application programs and the like. Client computer(s)/devices 810 can also be linked through communications network 816 to other computing devices, including other client devices/processes 810 and server computer(s) 812. Communications network 816 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8B:
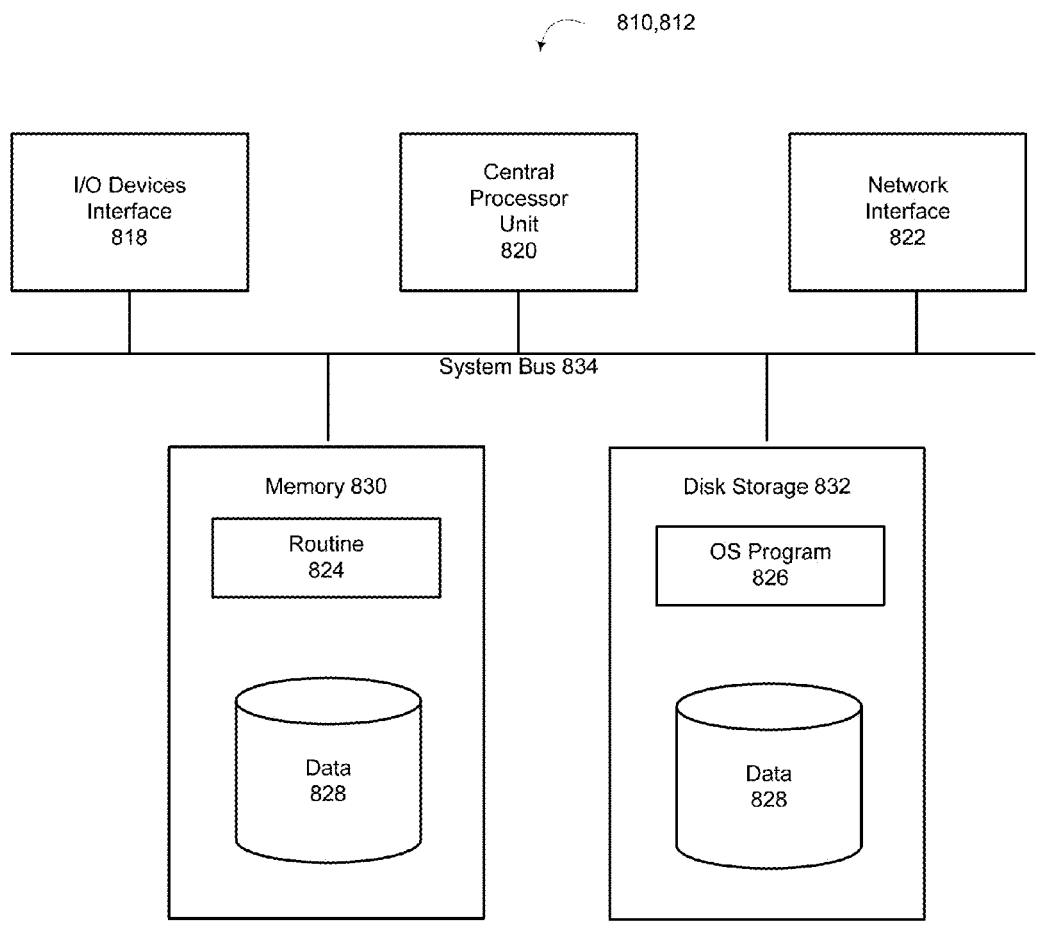
FIG. 8B is a block diagram of the computer nodes in the network of FIG. 8A.

FIG. 8B is a diagram of the internal structure of a computer/computing node (e.g., client processor/device 810 or server computers 812) in the processing environment of FIG. 8A. Each computer 810, 812 contains a system bus 834, where a bus is a set of actual or virtual hardware lines used for data transfer among the components of a computer or processing system. Bus 834 is essentially a shared conduit that connects different elements of a computer system (e.g., processor, disk storage, memory, input/output ports, etc.) that enables the transfer of information between the elements. Attached to system bus 834 is an I/O device interface 818 for connecting various input and output devices (e.g., keyboard, mouse, displays, printers, speakers, etc.) to the computer 810, 812. Network interface 822 allows the computer to connect to various other devices attached to a network (for example the network illustrated at 816 of FIG. 8A). Memory 830 provides volatile storage for computer software instructions 824 and data 828 used to implement an embodiment of the present invention (e.g., codec, video encoder/decoder code). Disk storage 832 provides non-volatile storage for computer software instructions 824 (equivalently, "OS program" 826) and data 828 used to implement an embodiment of the present invention; it can also be used to store the video in compressed format for long-term storage. Central processor unit 820 is also attached to system bus 834 and provides for the execution of computer instructions. Note that throughout the present text, "computer software instructions" and "OS program" are equivalent.

In one embodiment, the processor routines 824 and data 828 are a computer program product (generally referenced 824), including a computer readable medium capable of being stored on a storage device 828, which provides at least a portion of the software instructions for the invention system. The computer program product 824 can be installed by any suitable software installation procedure, as is well known in the art. In another embodiment, at least a portion of the software instructions may also be downloaded over a cable, communication, and/or wireless connection. In other embodiments, the invention programs are a computer program propagated signal product 814 (in FIG. 8A) embodied on a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 824, 826.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 824 is a propagation medium that the computer system 810 may receive and read, such as by receiving the propagation medium and identifying a propagated signal embodied in the propagation medium, as described above for computer program propagated signal product.

Digital Rights Management

In some embodiments, the models of the present invention can be used as a way to control access to the encoded digital video. For example, without the relevant models, a user would not be able to playback the video file. An example implementation of this approach is discussed in U.S. application Ser. No. 12/522,357, filed Jan. 4, 2008, the entire teachings of which are incorporated by reference. The models can be used to "lock" the video or be used as a key to access the video data. The playback operation for the coded video data can depend on the models. This approach makes the encoded video data unreadable without access to the models.

By controlling access to the models, access to playback of the content can be controlled. This scheme can provide a user-friendly, developer-friendly, and efficient solution to restricting access to video content.

Additionally, the models can progressively unlock the content. With a certain version of the models, an encoding might only decode to a certain level; then with progressively more complete models, the whole video would be unlocked. Initial unlocking might enable thumbnails of the video to be unlocked, giving the user the capability of determining if they want the full video. A user that wants a standard definition version would procure the next incremental version of the models. Further, the user needing high definition or cinema quality would download yet more complete versions of the models. The models are coded in such a way as to facilitate a progressive realization of the video quality commensurate with encoding size and quality, without redundancy.

Flexible Macroblock Ordering and Scalable Video Coding

To improve the encoding process and produce compression benefits, example embodiments of the invention may extend conventional encoding/decoding processes. In one embodiment, the present invention may be applied with flexible macroblock ordering (FMO) and scalable video coding (SVC), which are themselves extensions to the basic H.264 standard.

FMO allocates macroblocks in a coded frame to one of several types of slice groups. The allocation is determined by a macroblock allocation map, and macroblocks within a slice group do not have to be contiguous. FMO can be useful for error resilience, because slice groups are decoded independently: if one slice group is lost during transmission of the bitstream, the macroblocks in that slice group can be reconstructed from neighboring macroblocks in other slices. In one embodiment of the current invention, feature-based compression can be integrated into the "foreground and background" macroblock allocation map type in an FMO implementation. Macroblocks associated with features comprise foreground slice groups, and all other macroblocks (those not associated with features) comprise background slice groups.

SVC provides multiple encodings of video data at different bitrates. A base layer is encoded at a low bitrate, and one or more enhancement layers are encoded at higher bitrates. Decoding of the SVC bitstreams can involve just the base layer (for low bitrate/low quality applications) or some or all of the enhancement layers as well (for higher bitrate/quality applications). Because the substreams of the SVC bitstream are themselves valid bitstreams, the use of SVC provides increased flexibility in different application scenarios, including decoding of the SVC bitstream by multiple devices (at different qualities, depending on device capabilities) and decoding in environments with varying channel throughput, such as Internet streaming.

There are three common types of scalability in SVC processing: temporal, spatial, and quality. In one embodiment of the current invention, feature-based compression can be integrated into a quality scalability implementation by including the primary feature-based predictions in the base layer (see the section above on model-based primary and secondary predictions). The coded frames in the base layer can then serve as reference frames for coding in the enhancement layer, where secondary feature-based predictions can be used. In this way, information from feature-based predictions can be added incrementally to the encoding, instead of all at once. In an alternate embodiment, all feature-based predictions (primary and secondary) can be moved to enhancement layers, with only conventional predictions used in the base layer.

It should be noted that although the figures described herein illustrate example data/execution paths and components, one skilled in the art would understand that the operation, arrangement, and flow of data to/from those respective components can vary depending on the implementation and the type of video data being compressed. Therefore, any arrangement of data modules/data paths can be used.

While this invention has been particularly shown and described with references to example embodiments thereof, it will be understood by those skilled in the art that various changes in form and details may be made therein without departing from the scope of the invention encompassed by the appended claims.

What is claimed is:

1. A method of encoding raw video data, comprising:
    receiving multiple frames of raw video data;
    encoding the multiple frames of the raw video data to make an H.264 macroblock encoding;
    identifying, in the H.264 macroblock encoding, a groups of pels in close proximity to each other exhibiting encoding complexity, such that the group of pels of the H.264 macroblock encoding use a disproportionate amount of bandwidth computationally relative to other regions in one or more of the multiple frames of raw video;
    responding to the identified group of pels by forming tracking information including:
        detecting, in the identified group of pels, at least one of a feature or an object in a region of interest of at least one frame of the raw video data, the region of interest of the detected at least one feature not being aligned with the underlying macroblock grid;
        modeling the detected at least one of the feature and the object using a set of parameters; and
        associating any instances of the detected and modeled at least one of the feature or the object across plural frames of the raw video data providing at least one feature or object track of the associated instances, each feature or object track providing tracking information of respective associated instances;
    relating the at least one feature or object track to at least one macroblock of the raw video data to be encoded;
    producing an indirect model-based prediction of the at least one macroblock of the raw video data using the tracking information of the at least one related feature or object track, by using offsets between (i) the at least one macroblock of the raw video data and (ii) respective instances from the at least one related feature or object track to generate indirect predictions for the at least one macroblock of the raw video data, such that the feature or object track information is used indirectly to predict macroblocks instead of directly to predict the at least one feature or object, the indirect model-based prediction having model-based motion vectors;
    comparing the compression efficiency of a standards-compliant encoding derived from the model-based motion vectors with the compression efficiency of the H.264 macroblock encoding of the groups of pels in close proximity to each other exhibiting encoding complexity;
    caching the model-based motion vectors if it is determined that the standards-compliant encoding derived from the model-based motion vectors provides improved compression efficiency relative to the H.264 macroblock encoding of the groups of pels in close proximity to each other exhibiting encoding complexity; and
    incorporating the model-based motion vectors into a standards-compliant bit stream such that the model-based prediction is stored as standards-compliant encoded video data.

2. The method of claim 1 wherein detecting at least one of a feature or an object in a region of interest uses a detection algorithm, which is of a class of nonparametric feature detection algorithms.

3. The method of claim 1, wherein the set of parameters includes information about the at least one of the feature or the object and is stored in memory.

4. The method of claim 3, wherein the respective parameter of the respective feature includes a feature descriptor vector and a location of the respective feature.

5. The method of claim 4, wherein the respective parameter is generated when the respective feature is detected.

6. A codec for encoding raw video data, comprising:
an encoder encoding at least two frames of the raw video data to make an H.264 macroblock encoding;
the encoder identifying, in the H.264 macroblock encoding, a groups of pixels in close proximity to each other exhibiting encoding complexity, such that the group of pixels of the H.264 macroblock encoding use a disproportionate amount of bandwidth computationally relative to other regions in one or more of the multiple frames of raw video; and
the encoder responding to the group of pixels by forming tracking information by using:
a feature-based detector identifying the group of pixels as instances of a feature in the at least two video frames from the raw video data, where each identified feature instance includes a plurality of pixels exhibiting encoding complexity relative to other pixels in one or more of the at least two video frames, and where feature instances are not aligned with the underlying macroblock grid;
a modeler operatively coupled to the feature based detector and configured to create feature-based models modeling correspondence of the feature instances in two or more video frames, with all such feature instances related to at least one specific macroblock of video data to be encoded;
a cache configured to cache the feature-based models and prioritize use of the feature-based models if it is determined that a standards-compliant encoding of associated video data that is derived from the feature-based models provides improved compression efficiency relative to the H.264 macroblock encoding of the group of pixels; and
a prediction generator producing an indirect model-based prediction of the at least one specific macroblock of video data from its related feature instances, by using offsets between (i) the at least one macroblock of video data and (ii) the respective feature instances to generate indirect predictions for the at least one macroblock of video data, such that feature track information is used indirectly to predict macroblocks instead of directly to predict the feature instances, the indirect model-based prediction having model-based motion vectors, and said indirect model-based prediction including incorporating the model-based motion vectors into a standards-compliant bit stream such that the model-based prediction is stored as standards-compliant encoded video data.

7. The codec of claim 6, wherein the data complexity is determined when an encoding of the pixels by a conventional video compression technique exceeds a predetermined threshold.

8. The codec of claim 6, wherein the data complexity is determined when a bandwidth amount allocated to encode the feature by conventional video compression technique exceeds a predetermined threshold.

9. The codec of claim 8, wherein the predetermined threshold is at least one of:
a preset value, a preset value stored in a database, a value set as the average bandwidth amount allocated for previously encoded features, and a value set as the median bandwidth amount allocated for previously encoded features.

10. The codec of claim 6, wherein the first video encoding process includes a motion compensation prediction process.

11. The codec of claim 6, wherein the prioritization of use is determined by comparison of encoding costs for each potential solution within Competition Mode, a potential solution comprising a tracker, a primary prediction motion model, a primary prediction sampling scheme, a subtiling scheme for motion vector calculation and a reconstruction algorithm.

12. The codec of claim 11, wherein the prioritization of use of the feature-based modeling initiates a use of that data complexity level of the feature instance as the threshold value, such that if a future feature instance exhibits the same or more data complexity level as the threshold value then the encoder automatically determines to initiate and use feature-based compression on the future feature instance.

13. The codec of claim 6, wherein the feature detector utilizes one of an FPA tracker, an MBC tracker, and a SURF tracker.

14. A codec for encoding raw video data, comprising:
an encoder encoding at least two frames of the raw video data to make an H.264 macroblock encoding;
the encoder identifying, in the H.264 macroblock encoding, a groups of pixels in close proximity to each other exhibiting encoding complexity, such that the H.264 macroblock encoding of the group of pixels use a disproportionate amount of bandwidth computationally relative to other regions in the at least two frames of raw video;
the encoder responding to the group of pixels by using:
a feature-based detector identifying the group of pixels as an instance of a feature in at least two video frames of raw video data, an identified feature instance including a plurality of pixels exhibiting compression complexity relative to other pixels in at least one of the at least two video frames, with such identified feature not being aligned with the underlying macroblock grid;
a modeler operatively coupled to the feature-based detector, wherein the modeler creates a feature-based model modeling correspondence of the respective identified feature instance in the at least two video frames, with all such feature instances related to at least one specific macroblock of video data to be encoded;
a a cache caching the model-based motion vectors if it is determined that a standards compliant use of a respective feature-based model provides an improved compression efficiency when compared with the H.264 macroblock encoding of the group of pixels, said standards compliant use of the respective feature-based model including storing model based prediction information in an encoding stream; and
a prediction generator producing an indirect model-based prediction for the at least one specific macroblock of video data from its related feature instances, by using offsets between (i) the at least one macroblock of video data and (ii) the respective feature instances to generate indirect predictions for the at least one macroblock of video data, such that feature track information is used indirectly to predict macroblocks instead of directly to predict the respective feature instances, the model-based prediction using model-based motion vectors from the cache; and said indirect model-based prediction including incorporating the model-based motion vectors into a standards-compliant bit stream such that the model-based prediction is stored as standards-compliant encoded video data.

15. The codec of claim 14, wherein the improved compression efficiency of the identified feature instance is determined by comparing the compression efficiency of the identified feature relative to one of: a standards compliant encoding of the feature instance using a first video encoding process and a predetermined compression efficiency value stored in a database.

16. A method of encoding raw video data, comprising:
encoding at least two frames of the raw video data to make an H.264 macroblock encoding;
identifying, in the H.264 macroblock encoding, a groups of pixels in close proximity to each other exhibiting encoding complexity, such that the group of pixels of the H.264 macroblock encoding use a disproportionate amount of bandwidth computationally relative to other regions in one or more of the multiple frames of raw video; and
identifying the group of pixels in the H.264 macroblock encoding as an instance of a feature in the at least two video frames from the raw video data, the feature instance not being aligned with the underlying macroblock grid;
modeling a feature by vectorizing at least one of a feature pixel and a feature descriptor;
identifying similar features not aligned with the underlying macroblock grid by:
at least one of (a) minimizing means-squared error (MSE) and (b) maximizing inner products between different feature pixel vectors or feature descriptors; and
applying a standard motion estimation and compensation algorithm to account for translational motion of the feature, resulting in identified similar features;
associating the identified similar features with at least one specific macroblock of video data to be encoded; and
from the identified similar features, generating an indirect model-based prediction for the at least one specific macroblock of video data, by using offsets between (i) the at least one macroblock of video data and (ii) the respective similar features to generate indirect predictions for the at least one macroblock of video data, such that feature track information used indirectly to predict macroblocks instead of directly to predict instances of the respective similar features, the indirect model-based prediction having model-based motion vectors, said indirect model-based prediction including:
comparing the compression efficiency of a standards-compliant encoding derived from the model-based motion vectors with the compression efficiency of the H.264 macroblock encoding of the groups of pixels in close proximity to each other exhibiting encoding complexity;
caching the model-based motion vectors if it is determined that the standards-compliant encoding derived from the model-based motion vectors provides improved compression efficiency relative to the H.264 macroblock encoding of the groups of pixels in close proximity to each other exhibiting encoding complexity; and
incorporating the cached model-based motion vectors into a standards-compliant bit stream such that the feature modeling prediction and model-based motion vectors are stored as standards-compliant encoded video data.

17. A method of encoding raw video data, comprising:
implementing a model-based prediction by configuring a codec to encode a target frame from raw video data;
encoding a macroblock in the target frame using an H.264 macroblock encoding process, resulting in an H.264 macroblock encoding;
analyzing the macroblock encoding such that the H.264 macroblock encoding is deemed to be at least one of efficient and inefficient according to a codec standard if, in the H.264 macroblock encoding, a groups of pixels in close proximity to each other are identified as exhibiting encoding complexity, such that the group of pixels of the H.264 macroblock encoding use a disproportionate amount of bandwidth computationally relative to other regions in one or more of the multiple frames of raw video;
wherein if the H.264 macroblock encoding is deemed inefficient, analyzing candidate standards-compliant model-based encodings of the macroblock by generating several predictions for the macroblock based on multiple models, and applying the generated predictions, resulting in plural candidate standards-compliant model-based encodings of the macroblock including:
detecting an instance of a feature in the target frame from the raw video data, the feature corresponding to the group of pixels exhibiting the encoding complexity identified in the H.264 macroblock encoding; the feature instance not being aligned with the underlying macroblock grid;
modeling a feature by vectorizing at least one of a feature pixel and a feature descriptor;
identifying similar features not aligned with the underlying macroblock grid by:
at least one of (a) minimizing means-squared error (MSE) and (b) maximizing inner products between different feature pixel vectors or feature descriptors; and
applying a standard motion estimation and compensation algorithm to account for translational motion of the feature, resulting in identified similar features;
associating the identified similar features with at least one specific macroblock of video data to be encoded; and
from the identified similar features, generating an indirect model-based prediction for the at least one specific macroblock of video data, by using offsets between (i) the at least one macroblock of video data and (ii) the respective similar features to generate indirect predictions for the at least one macroblock of video data, the indirect model-based prediction having model-based motion vectors, such that feature track information is used indirectly to predict macroblocks instead of directly to predict instances of the identified similar features, said indirect model-based prediction including incorporating feature modeling prediction information and model-based motion vectors from the cache into a standards-compliant bit stream such that the feature modeling prediction and model-based motion vectors are stored as one of the standards-compliant encodings of the macroblock;
evaluating the resulting candidate standards-compliant model-based encodings of the macroblock according to encoding size;
ranking the candidate standards-compliant model-based encodings of the macroblock a relative to the H.264 macroblock encoding of the groups of pixels;

comparing the compression efficiency of the candidate standards-compliant encodings with the compression efficiency of the H.264 macroblock encoding of the groups of pixels; and encoding using the candidate standards-compliant it is determined that the candidate standards-compliant encoding provides improved compression efficiency relative to the H.264 macroblock encoding of the groups of pixels.

18. The method of claim 17, wherein the conventional encoding of the macroblock is efficient if an encoding size is less than a predetermined threshold size.

19. The method of claim 17, wherein the conventional encoding of the macroblock is efficient if the target macroblock is a skip macroblock.

20. The method of claim 17, wherein the conventional encoding of the macroblock is inefficient if the encoding size is larger than a threshold.

21. The method of claim 17, wherein if the conventional encoding of the macroblock is deemed inefficient, Competition Mode encodings for the macroblock are generated to compare their relative compression efficiencies.

22. The method of claim 21, wherein the encoding algorithm for Competition Mode includes:

subtracting the prediction from the macroblock to generate a residual signal;

transforming the residual signal using an approximation of a 2-D block-based DCT; and encoding transform coefficients using an entropy encoder.

23. The method of claim 17 wherein the encoder being analyzed by generating several predictions includes generating a composite prediction that sums a primary prediction and a weighted version of a secondary prediction.

* * * * *